United States Patent [19]

Eastman et al.

[11] Patent Number: 5,440,111
[45] Date of Patent: Aug. 8, 1995

[54] OPTICAL SYSTEM FOR SCANNING AND READING BARCODES WITH MANUALLY CONTROLLED SCAN BEAM LENGTH

[75] Inventors: Jay M. Eastman, Pittsford; Anna M. Quinn, Rochester; Scott R. Grodevant, Hilton; John A. Boles, Fishers, all of N.Y.

[73] Assignee: PSC, Inc., Webster, N.Y.

[21] Appl. No.: 268,876

[22] Filed: Jun. 30, 1994

Related U.S. Application Data

[63] Continuation of Ser. No. 960,021, Oct. 13, 1992, abandoned, which is a continuation of Ser. No. 652,158, Feb. 7, 1991, Pat. No. 5,200,597.

[51] Int. Cl.$^6$ .............................................. G06K 7/10
[52] U.S. Cl. ..................................... 235/462; 235/467
[58] Field of Search ................................. 235/462, 467

[56] References Cited

U.S. PATENT DOCUMENTS

| | | | |
|---|---|---|---|
| 5,010,242 | 4/1991 | Frontino | 235/467 |
| 5,059,779 | 10/1991 | Krichever et al. | 235/467 |
| 5,115,121 | 5/1992 | Bianco et al. | 235/467 |
| 5,117,098 | 5/1992 | Swartz | 235/467 |
| 5,229,591 | 7/1993 | Heiman et al. | 235/467 |
| 5,235,167 | 8/1993 | Dvorkis et al. | 235/467 |

Primary Examiner—Donald Hajec
Assistant Examiner—Steven P. Wigmore
Attorney, Agent, or Firm—M. Lukacher

[57] ABSTRACT

A unitary hand-held bar code scanner and reader produces an elliptical beam, oriented with its major axis along the direction of the bars, utilizing optics employing far field diffraction effects to shape the beam and maintain its elliptical aspect (length to width ratio) constant over a distance in front of the scanner were bar codes may be located. The optics eliminates parallax even though the photodetector and light source (preferably a laser diode) are located offset from each other on a board on which the optics are mounted. A housing assembly has channels which mount the board therein without shock absorbing devices. A digital microcomputer controller and peripheral devices regulate the optical power output from the laser diode and prevents catastrophic failure, if the electrical current through the laser diode exceeds safe limits. Digital control of the gain of the electronic circuits which provide the signals from which bar code information can be decoded and for the operation and control of a motor for oscillating a deflector which scans the beam across the code are also provided utilizing the microcomputer. The microcomputer also controls interface circuits to provide compatibility with auxiliary equipment and host computers which generate commands and requires data inputs of various polarity and format.

10 Claims, 14 Drawing Sheets

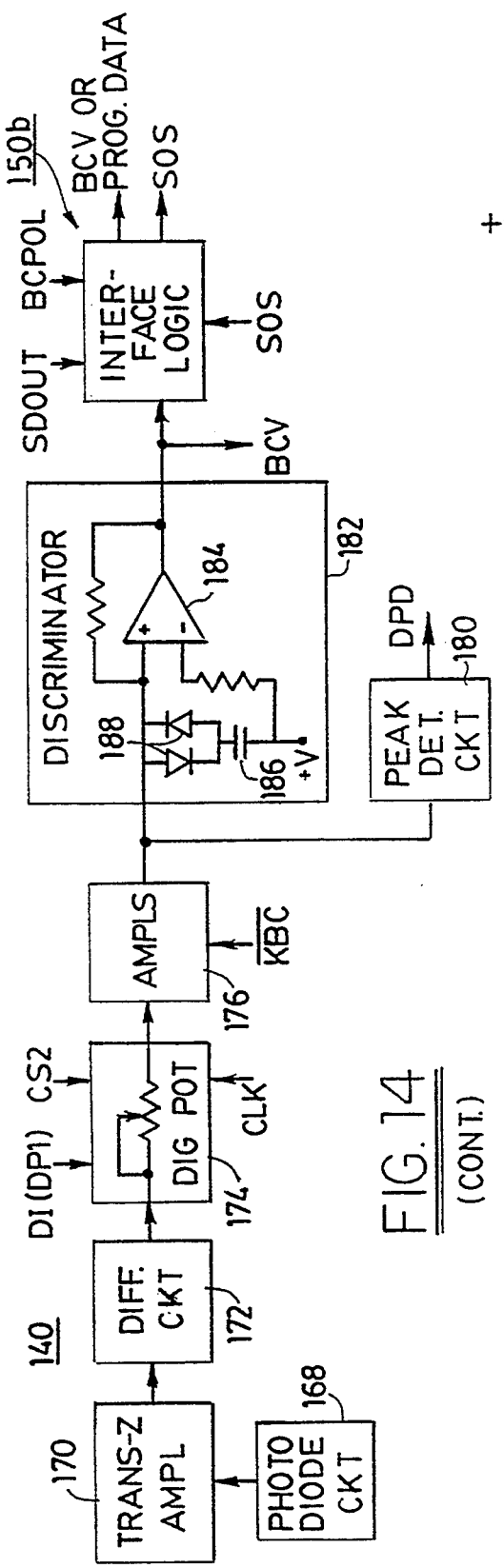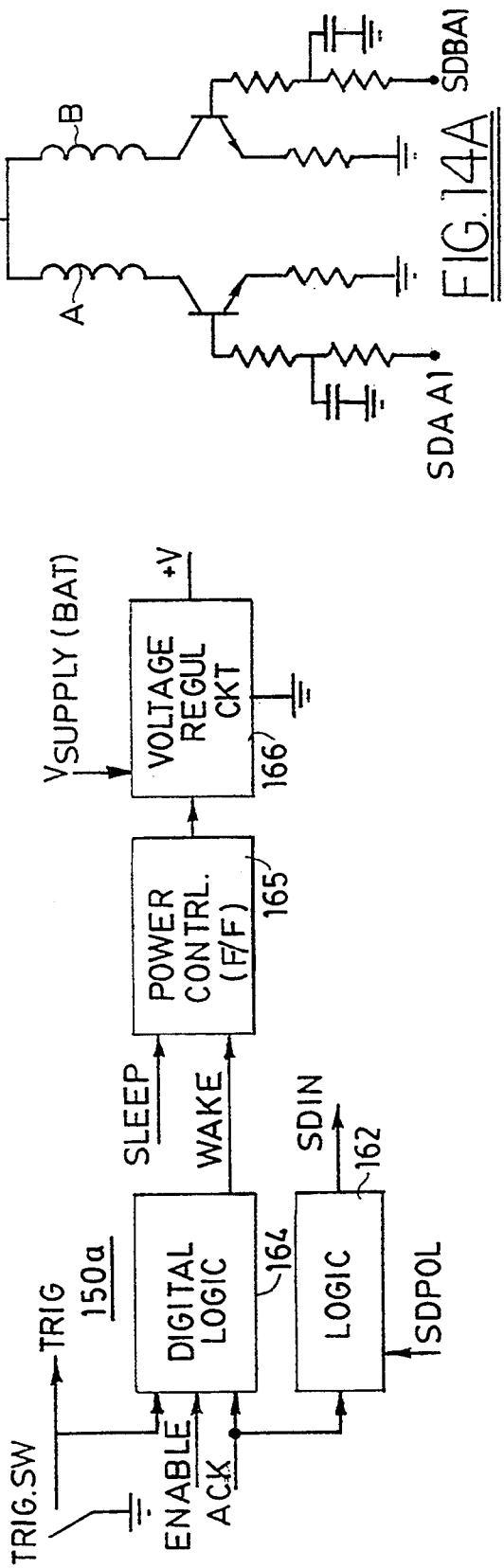
FIG. 14
FIG. 14 (CONT.)
FIG. 14A

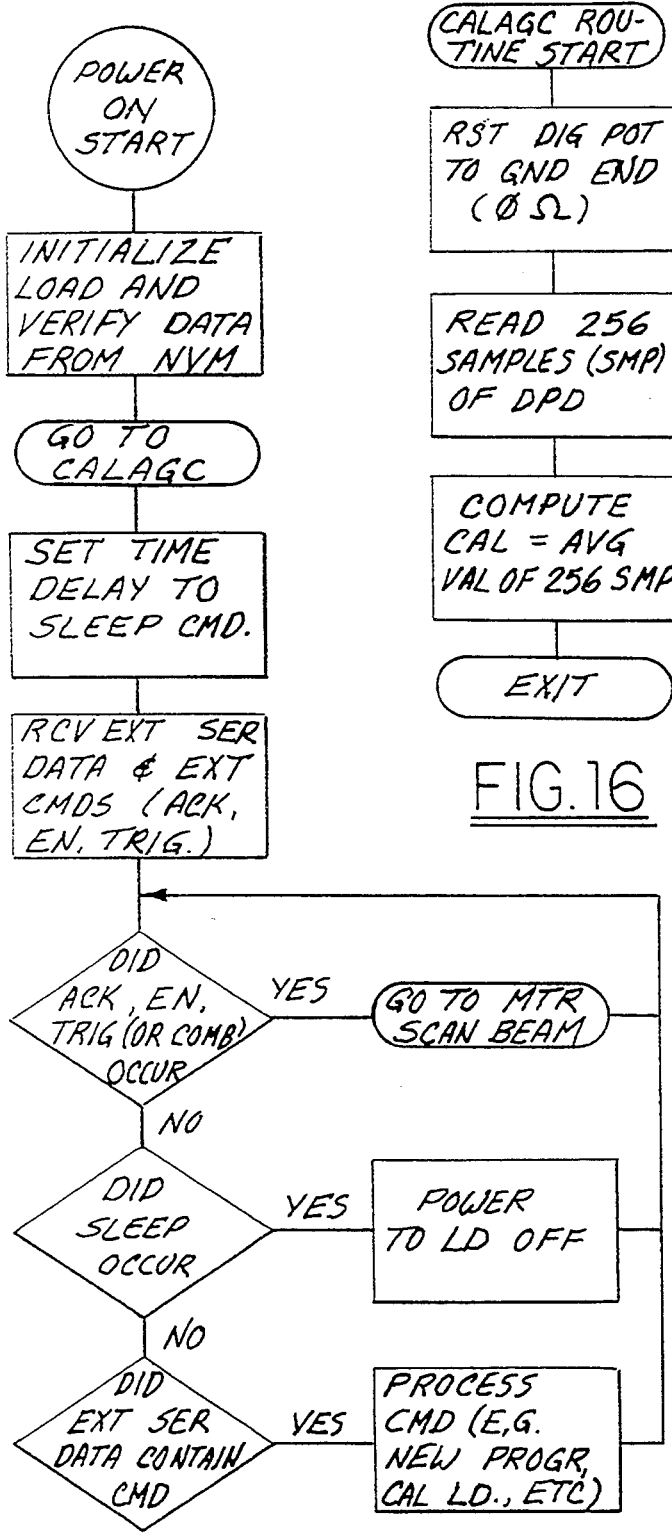
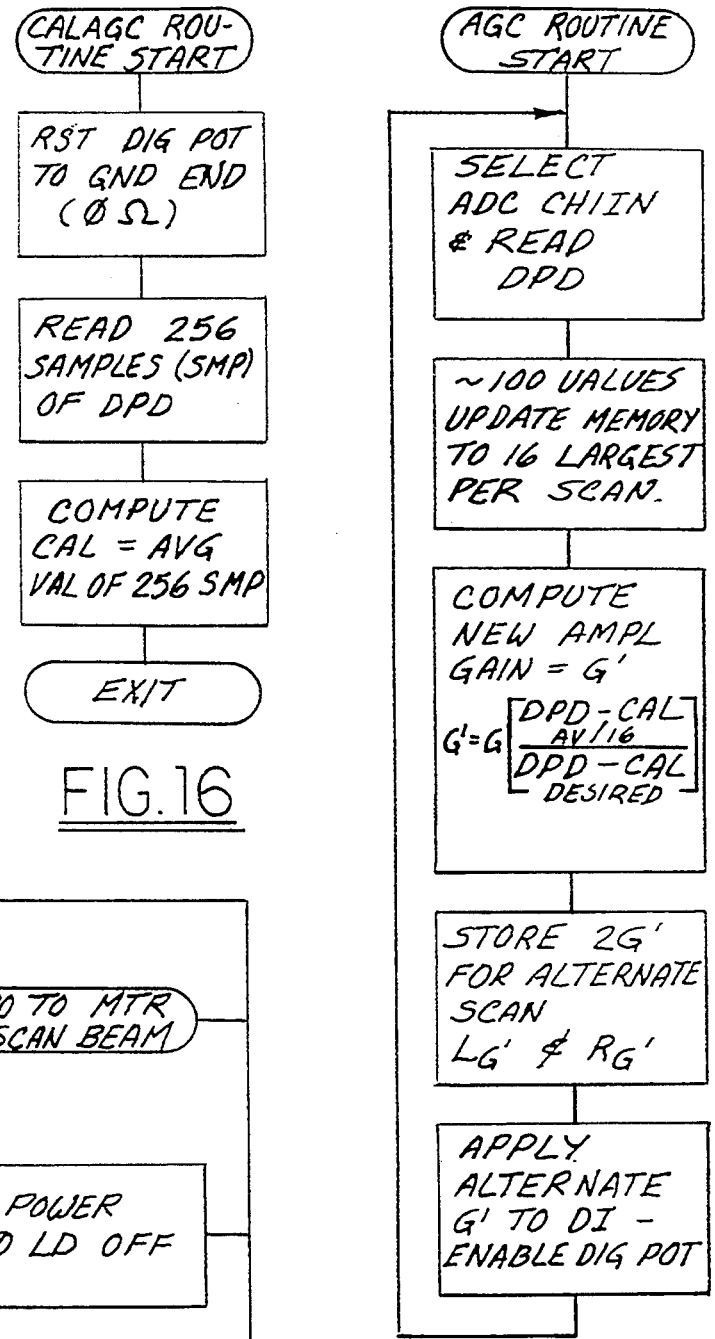
FIG. 16
FIG. 17
FIG. 15

SD (PORT) SIGNAL VALUES

| | |
|---|---|
| A+ | I=0 |
| B+ | I=1 |
| A+ | I=2 |
| B+ | I=3 |
| | |
| | I=(N-1) |

PHASE A
SDAA1
SDAA2
SDBB1
SDBB2

PHASE B
SDAB1
SDAB2
SDBA1
SDBA2

FIG. 21

PULSE WIDTH TABLE

| |
|---|
| $t_i=1$ |
| $t_i=2$ |
| $t_i=3$ |
| $t_i=4$ |
| |
| $t_i=N$ |

FIG. 20

OPTICAL SYSTEM FOR SCANNING AND READING BARCODES WITH MANUALLY CONTROLLED SCAN BEAM LENGTH

CROSS REFERENCE TO RELATED APPLICATION

This is a continuation of application Ser. No. 07/960,021, filed Oct. 13, 1992, abandoned, which is a continuation of Ser. No. 07/652,158, filed Feb. 7, 1991, now U.S. Pat. No. 5,200,597, issued Apr. 6, 1993.

FIELD OF THE INVENTION

The present invention relates to systems for scanning and reading bar codes and other optically discernible symbols and, particularly, to a bar code scanner and reader system which is adapted to be hand-held and digitally controlled.

BACKGROUND OF THE INVENTION

The invention is especially suitable for providing an integrated hand-held bar code scanner unit having optics and digital electronic control facilities, in an assembly adapted to high volume manufacturing techniques, and which is applicable for use with computer systems of different types from different manufacturers. Features of the invention in its optical aspects, particularly optical beam shaping and arrangement of optical elements, as well as its computerized control and motor drive systems, may find other applications in opto-electronic or photonic systems.

Bar code scanners produce a beam of light, often from a laser, that is appropriately shaped by beam forming optics and then scanned across a bar code symbol by a deflector such as an oscillating mirror or rotating polygon having mirror facets. Scattered light from the bar code is collected in collection optics and is incident on a photodetector in the scanner. The photodetector converts the return light into a time varying analog signal that is an electrical representation of the physical bar and space widths. Subsequent circuits convert this signal into a logic level pattern with analog timing that represents the bar code. This logic level pattern is sent to a computer and decoded to determine the characters in the message represented by the bar code. The bars and spaces are resolved by the laser spot where the scanning beam is incident on the code. Aperture stops and lenses have been used to shape the beam and the resolving spot.

Bar code scanners have used gas (HeNe lasers) that produce circular scanning spots. However, bar code symbols are often printed with low resolution printing processes, for example, using dot matrix printers, and may be subject to harsh environments or abrasion during handling. These factors cause voids to be present in the printed bars. Dust and dirt on the bars can result in obscuration of the spaces between the bars. The presence of these defects may cause reading errors.

It has been proposed to use an elongated scanning spot to decrease the probability of a reading error. The elongated, for example, elliptically shaped spot, with its major or long axis arranged parallel to the long dimension of the bars and spaces in the code, averages over the length of the bars and spaces and minimizes the effects of small defects. Anamorphic optics have been suggested for use in a bar code scanner with a gas laser which produces a circular spot in order to provide an elliptical laser spot (see, U.S. Pat. No. 4,721,860, issued Jan. 26, 1988).

Laser diodes have been used in scanners which, because their small size, as opposed to the gas laser, enables the scanner to be miniaturized. However, the beam from a laser diode is not symmetrical. For example, a visible laser diode, which is now commercially available from Toshiba (their model TOLD 9200), diverges approximately 34° in one direction and 7° in a direction orthogonal thereto. It has been proposed also, to use lenses and apertures to shape such a beam into a elliptical beam. However, such beams do not stay in the same width to height aspect ratio relationship. Rather, the beam flips so that its long dimension, initially aligned along the length of the bars, becomes oriented orthogonally to the bars of the code (see, U.S. Pat. No. 4,896,026, issued Jan. 23, 1990). The desired averaging, over the length of the bars and spaces, to minimize the effect of printing defects, is therefore not obtained throughout the working range of the scanner. Moreover, the beam becomes incapable of resolving fine (narrow or high resolution) bars and spaces. This situation can be alleviated by the use of an anamorphic optical system in which the beam is colliminated in the vertical direction (along the length of the bars of the code) and focused in the horizontal direction (see, U.S. Pat. No. 4,820,911, issued Apr. 11, 1989).

It is therefore desirable to provide a beam forming and shaping system wherein the optics provide an elongated beam which maintains its width to height aspect ratio over the entire range in front of the scanner (which may be a one to several feet long range) and is oriented with a long axis along the bars and spaces of the code and not transverse thereto. This objective has been accomplished in accordance with the invention through the use of optics which operate by diffraction and which utilize to advantage the diverging characteristics of the beam from a visible laser diode. The beam forming system of the invention has many advantages over traditional optics which are designed in accordance with geometric optic principles and which, in practice, as discussed above are subject to having the long axis of the beam flip so that the beam is no longer orientated with its long axis along the length of the bars and spaces in the code and are subject to decreased resolution and enhanced sensitivity to defects in the code.

Although there has been some statements in publications and patents that diffraction mechanisms are at work when a focused beam passes through an aperture (see A. Erteza, "Active Autofocusing Using an Aperture Gaussian Beam", Applied Optics, Volume 15, No. 9, pages 2095–2096 (September 1976) and U.S. Pat. No. 4,808,804 issued Feb. 28, 1989), it has not been appreciated how to use a diffraction mechanism and diffractive optics to advantage in shaping a beam, particularly a diverging beam from a laser diode, and maintaining it in proper orientation and aspect ratio with respect to the bars of a bar code. In addition, an optical beam shaping system in accordance with the invention requires fewer components (physical aperture stops and their supporting mechanisms can be eliminated), and the complexities of anamorphic optics are avoided.

To this end, the invention provides a system (method and apparatus) for producing a pattern of generally monochromatic light having a predetermined configuration and orientation over a range of distances in which the symbol to be recognized, for example a bar code, may be located. A diffracting element is placed in the path of the beam which forms the light in the beam in a profile having a desired configuration and orientation, preferably an elliptical configuration in which the major axis of the beam is in a direction along the bars and spaces of the code, due to far field diffraction in the range where the code is to be resolved. Far field diffraction is defined as diffraction which results beyond the Fresnel distance from the source or the exit pupil of an optical system following the source. Preferably this exit pupil is provided by a lens of short focal length which brings the end of the range where far field diffraction effects occur in the vicinity of the window of the scanner through which the beam is projected or in the vicinity of the plane closest to the scanner in which it is desired to read a coded symbol. In the far field, the beam diverges at an angle which is approximately inversely proportional to the effective aperture of the beam. This effective aperture is preferably provided at the exit pupil, defined optically in a lens which focuses the beam from the laser. If the beam diverges, as it does from a laser diode, the effective aperture will have a long dimension and a short dimension which may be oriented with respect to the bars of the code. No physical or hard aperture is required. Through the use of the lens, the Fresnel distance due to the longest dimension (length) of the aperture (since the shortest Fresnel distance is proportional to the length of the aperture squared, the Fresnel distance for the short dimension occurs before the Fresnel distance for the long dimension) is typically located inside the scanner and ahead of the scanner's window through which the beam is projected towards the code. In long range scanning applications, the Fresnel distance for the longest dimension may be located at the closest desired reading plane, which may lie exterior to the scanner. The focal length and location of the lens is adjusted with respect to the location of the laser diode and the divergence of its beam so that the effective or phantom aperture within the lens (which is located at the principal plane of the lens where the lens starts to focus the beam) is such that the aspect ratio (length to width of the elliptical beam) remains generally constant over the range where the code is located for scanning. Accordingly, far field diffraction shapes the profile of the beam into a spot of width and length where the beam is incident on the code (in the plane of the code) so as to provide the desired shape without the need for anamorphic optics and using to advantage diffraction effects, to obtain high resolution scanning. The invention does not depend upon traditional geometric optics for shaping and focusing the beam wherein diffraction effects have produced undesirable results.

The optics of a scanner, particularly the laser and its beam projecting optics which produce the outgoing beam and the detector which receives the incoming beam have traditionally been located in alignment. In order to save space and reduce the size of the scanner head and particularly the scan module in the head, the photodetector and the laser have been mounted on a plate, usually a printed circuit board in offset relationship. Then the symmetry between the incoming and outgoing beams is lost and parallax is introduced. Parallax is the difference in apparent direction of an object as seen from two different points not on a straight line with the object. In a scanning system, this translates into a nonuniformity of return signal across the scan. If the change in signal across the scan is large, the dynamic range of the electronic circuitry may not be enough to compensate for the change in signal.

SUMMARY OF THE INVENTION

It has been found in accordance with the invention that the parallax problem can be solved, even though the photodetector and the laser are physically out of alignment with each other and are spaced apart on a single board on which they are mounted. Briefly described, the arrangement utilizes a fixed mirror from which the laser beam is reflected to an optical deflector, such as an oscillatory mirror, and is projected from the deflector over a scan path with traverses a center of scan as the beam scans back and forth across the code. The mirror also collects the return light and directs it to the photodetector. The oscillatory mirror, the laser and the photodetector are arranged with respect to the fixed mirror so that the outgoing beam (when it is in the center of the scan) and the return beam travel along paths which are in the same plane. Symmetry is therefore provided between the incoming and outgoing beams and parallax is eliminated.

It has traditionally been the practice to mount the optical assembly of a scanner to the case or housing in which the scanner is contained with shock mounts; the purpose being to isolate the optical assembly from shocks which could be transmitted to the assembly if the scanner was dropped onto the floor. The assembly of the scanner with shock mounts increases its cost due to the additional cost of the shock mounts and the additional labor to install the mounts. Moreover, resonances in the mechanical system can be introduced due to the compliance of the mounts which amplifies the shock forces.

It has been found in accordance with the invention that the optical assembly can be mounted on a single board which is held in the scanner housing in tracks which may be provided by channels formed around the inside surface of the housing. The board is inserted into the channel on one-half of the housing and then into an opposing channel in an opposite half the housing when the housing is assembled by bringing the housing halves together and fastening them together by attachment devices. It has been found that this mounting arrangement is more advantageous than shock mounts in that it avoids resonances introduced by the shock mounts. The shock forces which are applied to the board via the mounts has a frequency spectrum which includes frequencies at which the mechanical system of the board and the mount are resonant. Therefore shock mounting can give rise to destructive forces. Such forces do not occur in the mounting system provided by the invention wherein the board is held in the channels in the housing halves.

Operation of a scanner involves turning the laser on and off in response to trigger signals from a switch on the scanner or from an external terminal or control computer system to which one or more scanners are connected in a network. These control computers have facilities for decoding the bar code and also for turning the scanner on and off when a code is to be read. It is desirable that the scanner be universally applicable for use with various control or host computers which may provide commands or which provide data for programming the scanner. This data may be in different formats, for example signals of different level or polarity. Heretofore, bar code scanners have been designed for compatibility with only one type of computer or with one family of computers which utilizes the same code, protocol or data format, as regards level and polarities.

It is also necessary, particularly to comply with governmental standards concerning radiological health and safety, that the laser power be regulated to be maintained within the certain power and intensity levels. In addition, there are circumstances, such as operation in high temperature environments, where the current for operating the laser increases to a level that destroys (burns up) the laser. Laser diodes are particularly sensitive to the level of current which is used to drive them and can be destroyed if the current exceeds a safe level.

Another problems arises out of the variation and intensity of the scattered light which is returned from the code. Analog automatic gain control circuits have been used to vary the gain of the preamplifiers and amplifiers following the photodetector so that the digitizer which provides the analog bar code signal does not become overloaded on the one hand or does not receive signals of such low level that they cannot be tracked and converted with high accuracy.

A still further problem is in the area of controlling the beam so that it scans at essentially constant velocity across the code. Motor control circuits have been proposed for driving motors for oscillating a mirror so as to deflect and scan the beam (see for example U.S. Pat. No. 4,496,831 issued in September 1985) wherein opposing motor drive current are controlled in an analog fashion, one for electromagnetic bias and the other for driving force generation.

Still another problem arises when there are a number of closely spaced codes on a package or sheet which must be individually read. The scan wide enough to read any one code may be positioned so as to overlap adjacent codes thereby causing misreads or erroneous reads. In addition, a wide scan, particularly from a visible laser diode, spreads the intensity over a large distance so that it may be too dim to be observed for training the beam on the code of interest. In this connection it has been proposed to use a narrow scan and, when a few bars are read, to automatically increase the scan length (see U.S. Pat. No. 4,933,538 issued Jun. 12, 1990). If the scan length is automatically increased, it still can overlap an adjacent code which is not intended to be read.

All of these problems are resolved in accordance with the invention by a digital control system utilizing a computer. The computer generates digital gain control signals depending upon the intensity of the return light detected on a scan and adjusts the gain digitally so that on a subsequent scan, the signal level is optimum. The digital gain control can be non-linear by changing the relationship between the value of the digital control signal and the intensity of the detected light in a way to more quickly bring the gain of the system to its proper value than would be the case with an analog automatic gain control system. The digital control of gain is afforded by a digitally operative potentiometer in the amplifiers which amplify the photo detected bar code signal and which can be set to provide the required resistance corresponding to a desired level of amplifier gain.

Digital control, again utilizing a digital potentiometer in a control loop, regulates the current which drives the laser so that the digital control computer can control the laser power. The laser power can be regulated to a preset value dictated by governmental health and safety regulations on initialization utilizing a digital control signal corresponding to laser output power of desired level.

The digital control computer can also generate digital control signals for operating the motor which drives the deflector (the scanning mirror). These signals may be in the form of pulses which are pulse-width modulated (vary in duration) so as to control the instantaneous velocity as well as the frequency of oscillation. The control signals also control the scan length and may be varied in response to a manual actuator which produces a signal that depends upon the pressure exerted by an operator on a trigger or control lever of the scanner. When the trigger is released or has only light pressure applied thereto, the length of the scan can be set to be quite small or stationary. This small or short scan is quite bright and enables the beam to be located on the code by visual observation of the spot of light incident on the code. Then by increasing the pressure on the trigger or control lever, the digital control signal which drives the motor changes so as to increase the scan length either linearly or non-linearly in response to pressure. The length can be increased to be just sufficient to scan the particular code of interest and not overlap any adjacent codes.

Universal operation with various types of host or control computer systems regardless of their format can be obtained by programming the control computer in the scanner from the host so as to provide the bar code signals which are received by the host and the commands which are generated by the host and transmitted to the scanner in the desired polarity and level and with the desired protocol or format.

With the inventive system hereof, all of the control functions necessary or desirable from the scanner are obtained by way of digital control with a microcomputer which is mounted in the scanner.

The foregoing and other objects, features and advantages of the invention as well as a presently preferred embodiment thereof will become more apparent from a reading of the following description in connection with the accompanying drawings in which.

Figure 14:
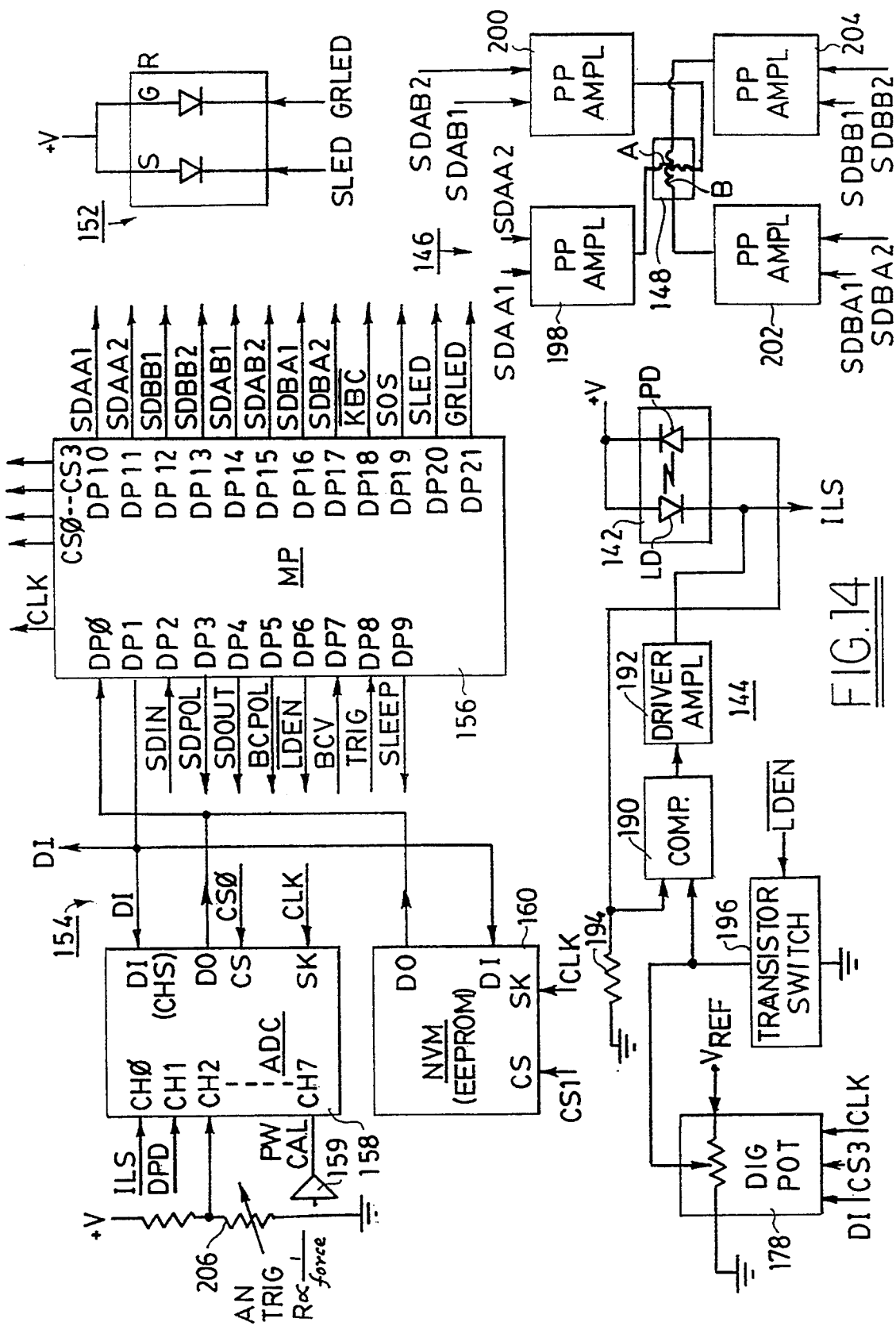
Figure 18:
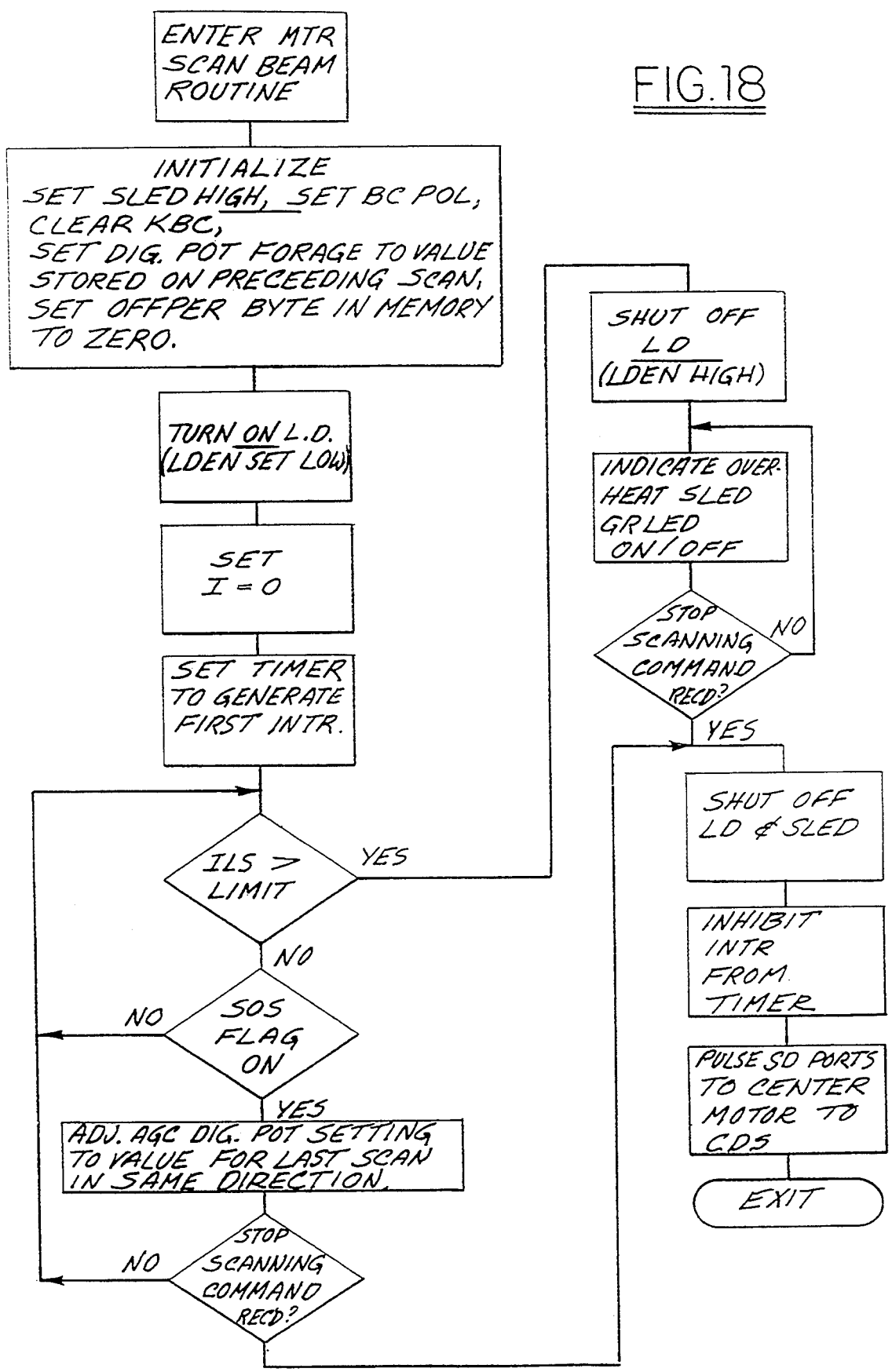
Figure 19:
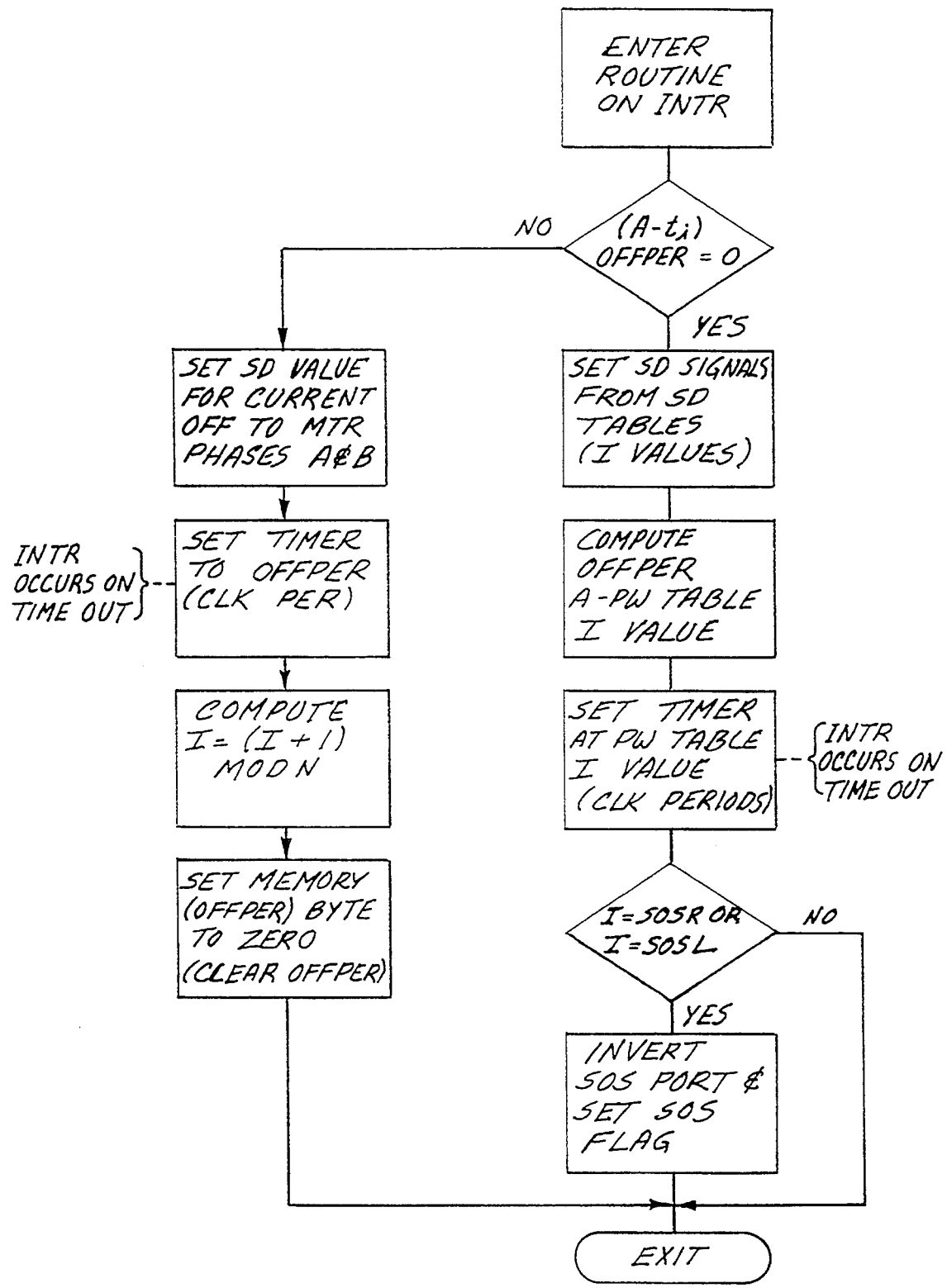

FIG. 14 (which is shown in two parts, 14 and 14 (Cont.) is a block diagram of the electronic system of the scanner/reader illustrated in the preceding figures;

FIG. 14A is a schematic diagram of another embodiment of the motor control circuit of the system shown in FIG. 14;

FIG. 15 is a flow chart illustrating the overall programming of the digital computer (microprocessor) of the system shown in FIG. 14;

FIG. 16 is a flow chart illustrating the program utilized in calibration of the automatic gain control codes (CALAGC) of the program shown in FIG. 15;

FIG. 17 is a flow chart of the automatic gain control program of the digital controller;

FIG. 18 is a flow chart of the motor control program (the SCAN BEAM routine) of the program illustrated in FIG. 15;

FIG. 19 is a flow chart of the routine for generating the scan control signals to the scanning motor which is carried on during the scan beam routine; and FIGS. 20 and 21 are tables of values which are stored in the computer and used in the program illustrated in FIG. 19 for generating the pulse width modulated motor drive pulses.

DETAILED DESCRIPTION OF THE INVENTION

Figure 3:
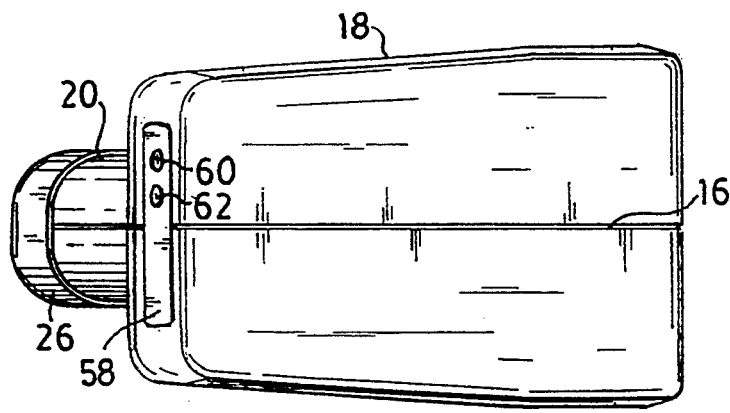
FIG. 3 is a top view of the scanner/reader system shown in FIGS. 1 and 2.
Figure 1:
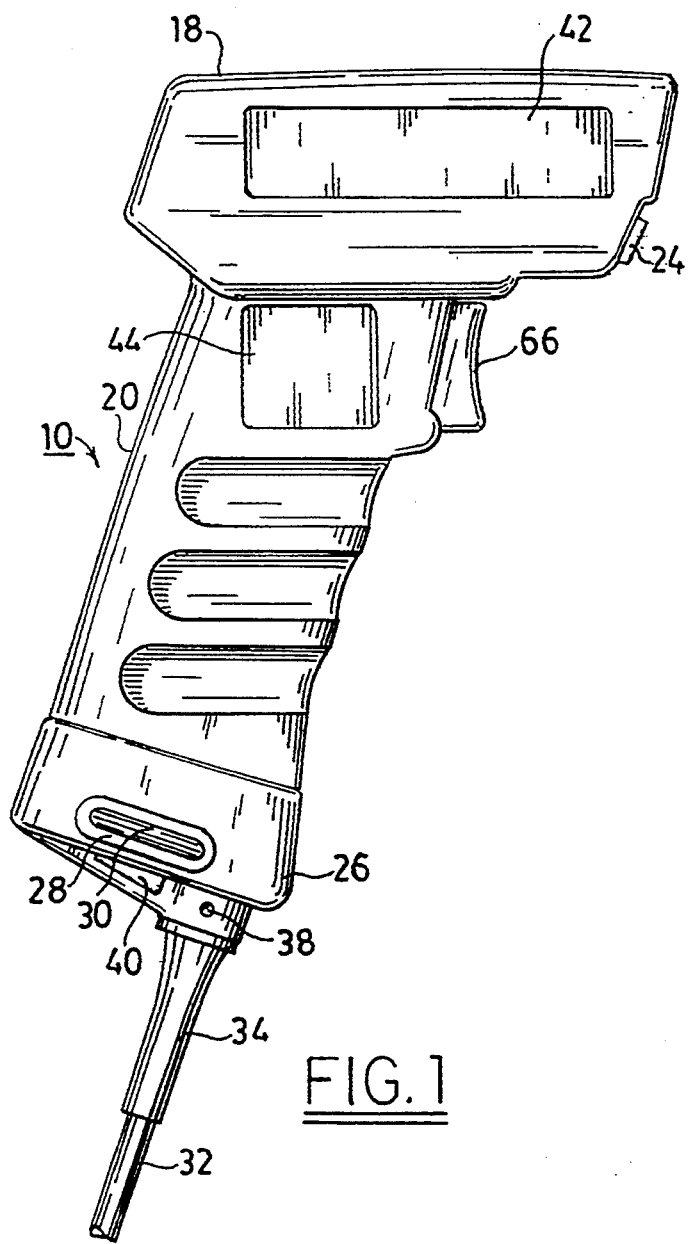
FIG. 1 is a side view of a bar code scanner and reader system in accordance with the presently preferred embodiment of the invention.
Figure 2:
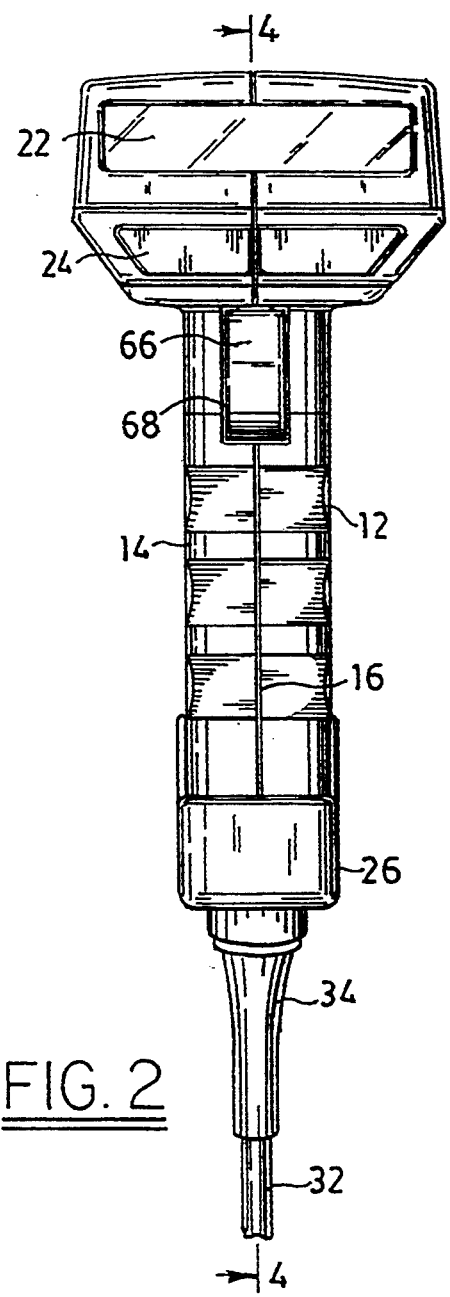
FIG. 2 is an end view from the right of the scanner/reader system shown in FIG. 1.

Referring first to FIGS. 1, 2 and 3, there is shown a hand held scanner/reader for bar code symbols. A housing 10 contains the electronics and optics of the unit. It is a bi-part housing having right and left halves 12 and 14 which are assembled together along a parting plane 16 where the halves interconnect. The housing has a head portion 18 and a handle portion 20. The front of the head portion has an opening in which a window 22 of transparent material is disposed. The scanning beam is projected out of this window towards the bar code and light scattered by the code is returned to the window to be detected and processed by the optical and electrical components within the housing 10.

The head portion 18 has an indentation 42 for a label. Another indentation 44 in the handle can also receive a label.

Figures 4, 4A:
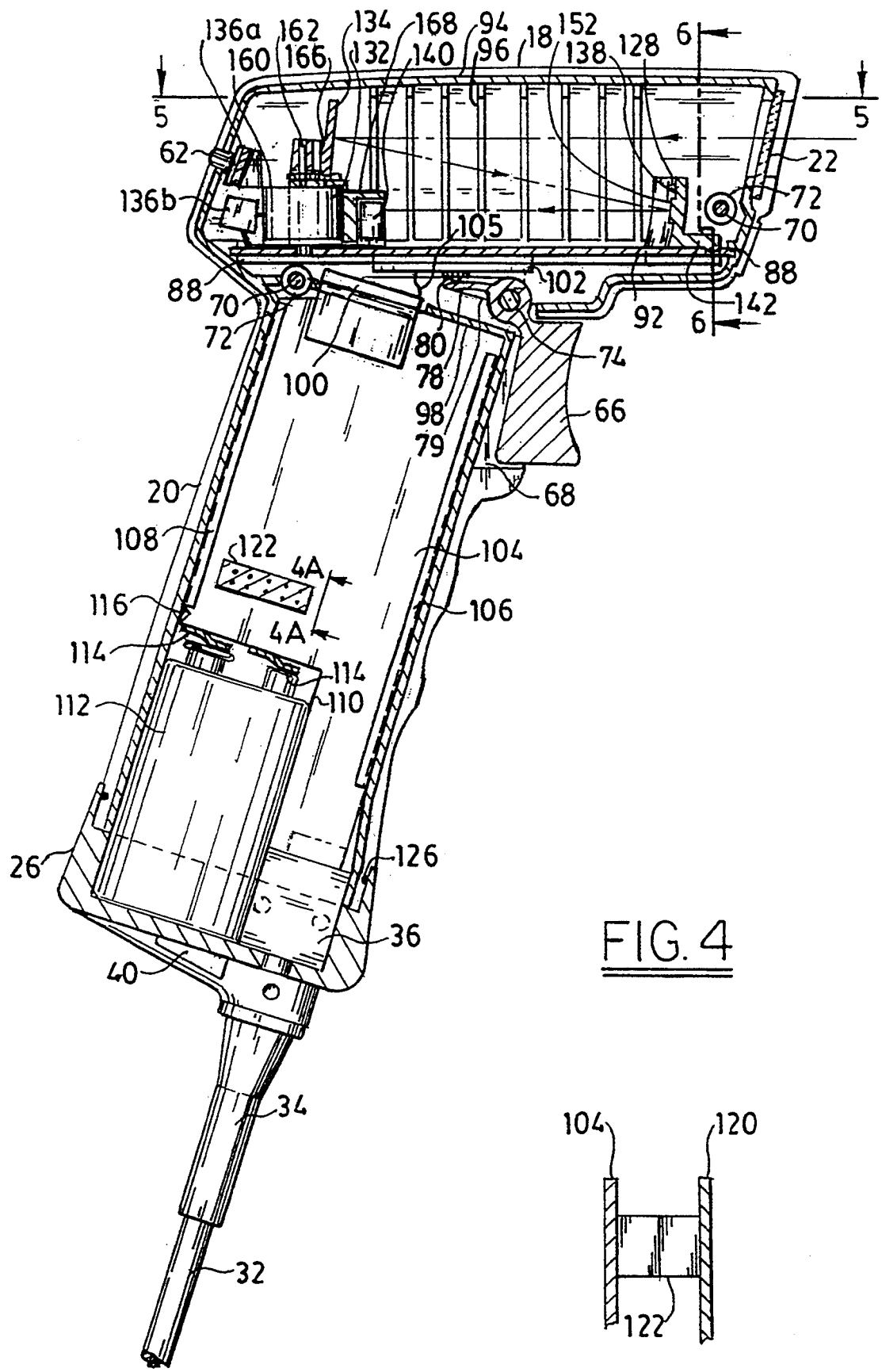
FIG. 4 is a sectional view of the reader shown in FIGS. 1, 2 and 3, the section being taken along the line 4—4 in FIG. 2.
FIG. 4A is a fragmentary sectional view doing the line 4A—4A in FIG. 4.
Figure 5:
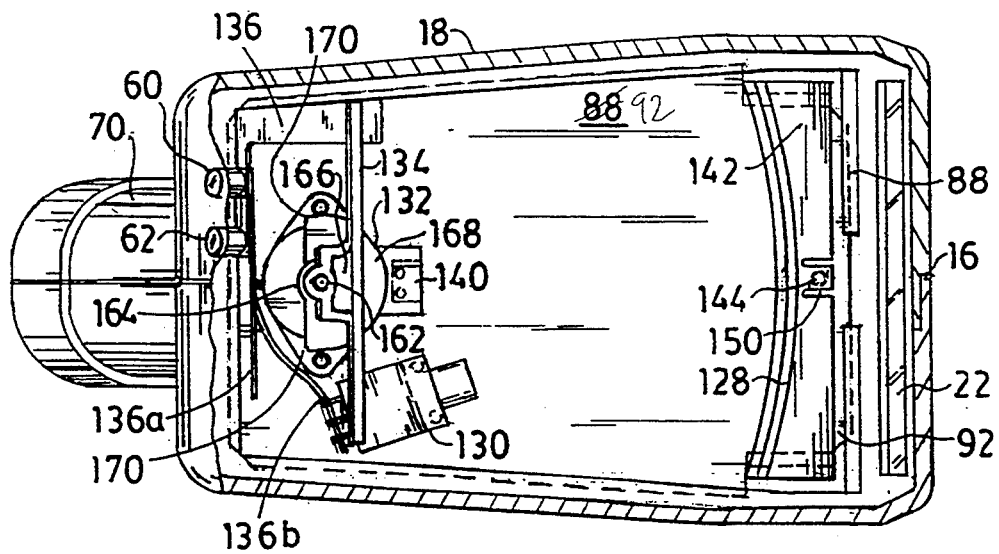
FIG. 5 is a sectional view of the scanner shown in FIGS. 1 through 4, the view taken along the line 5—5 in FIG. 4.
Figure 6:
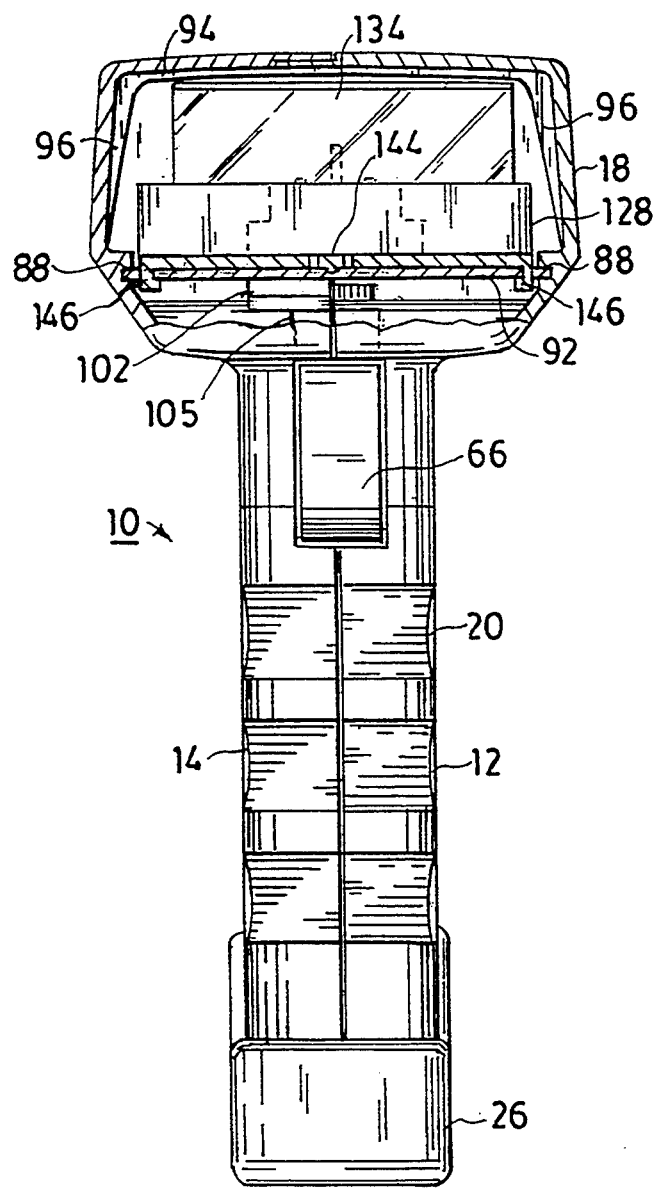
FIG. 6 is a fragmentary sectional end view of the scanner shown in FIGS. 1 through 5, the section being taken along the line 6—6 in FIG. 4.

The front of the head portion 18 also carries feet 24 of elastomeric (rubber) material which provides a rest for the scanner/reader unit on the feet 24 and at a point at the end of the handle 20 where an end cap 26 is attached. The end cap is a cup shaped member having an opening 28 through which a detent catch 30 extends to latch the end cap on the end of the handle 20. An electrical cable 32 protected by a grommet 34 which may be part of a strain relief for a male part of a modular connector 36 contained within the grommet which connects the wires in the cable 32 to the female part of the modular connector 36 (see FIG. 4) in the end of the handle. The modular connector may be released by inserting a pin through an opening 38. Another opening 40 provides access for a chain or rope from which the unit may be hung for ready access by the operator.

The rear end of the head portion is adapted to receive, in an indentation 46 therein having holes 48 in which catches are formed (see FIG. 12), a block or strip 58 with openings through which indicator lamps 60 and 62 extend. These lamps extend through a slot 64 in the rear end of the head 18 (see FIG. 12). The lamps 60 and 62 may be light emitting diodes (LEDs) which indicate that scanning is going on by being illuminated in one color (e.g., amber) while the other LED 62 may be of another color (e.g., green) to indicate that a bar code symbol has been successfully read. The strip may contain a connector for a display module (for example using a liquid crystal device) which reads the bar code message or other data (for example during self test using self test routines entered on receipt of command codes from the host computer or terminal associated with the scanner) which is generated in the operation of the scanner/reader unit or in the testing thereof. The display module attaches to the scanner via catches that engage holes 48.

The handle portion has a trigger button 66 which is movable into and out of a hole 68 and operates a switch or variable resistor device which can switch the unit on or off and can control the length of the scan so as to aim and position the beam for scanning desired codes; for example, one of several codes which may be printed closely adjacent to each other on the side of a package or a sheet containing bar codes.

Referring to FIGS. 4 through 6, 12, 12A, 13 and 13A, the design of the housing 10 in accordance with the presently preferred embodiment of the invention will become more apparent. The housing halves 12 and 14 are held together by screws 70 which are threaded into posts 72. There are similar posts with holes therethrough in the left housing half 14. The trigger 66 is a bell crank which is journaled on a pin 74 surrounded by a sleeve 76 to form a re-entrant structure which provides a long path and acts as a shield for static electricity from the outside of the unit into the inside of the unit where the electronic circuitry is disposed, thereby protecting that circuitry against adverse affects of static electric discharge. A nose 78 of the bell crank trigger 66 engages a spring biased switch button 80 which biases the button 66 outwardly of the housing to the position shown in FIG. 4. This nose is rigid and has a gusset 79 to insure that there is no flexure thereof. The switch generates a trigger command in the electronics when it is actuated.

Figure 13:
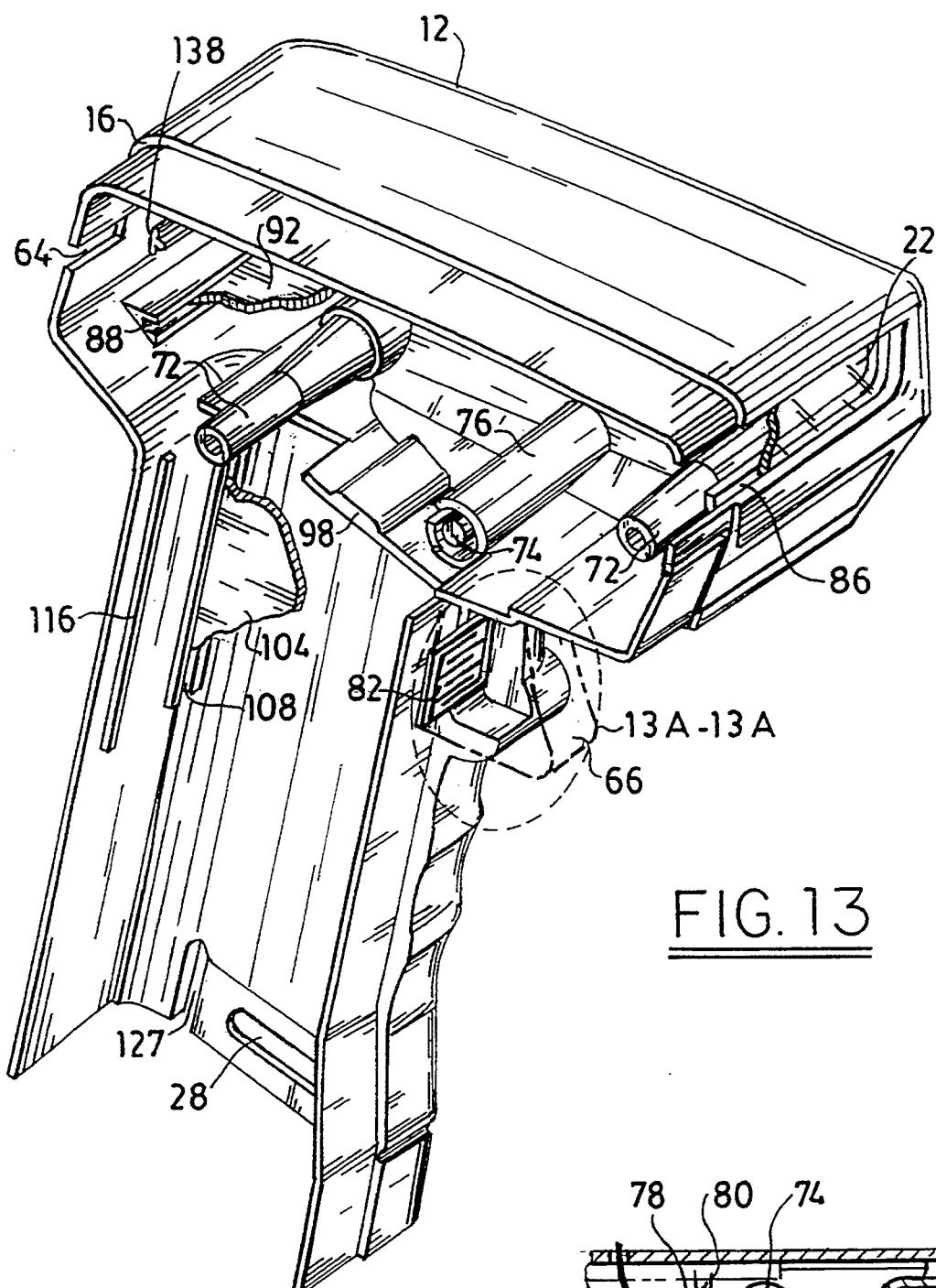
FIG. 13 is a perspective view of the housing half shown in FIG. 13 when viewed from the front.
Figure 13A:
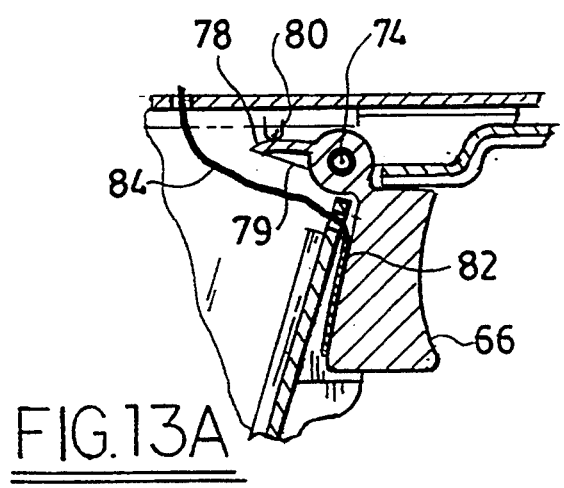
FIG. 13A is an enlarged sectional view of the area inside of the lines 13A—13A in FIG. 13.

Attached either to the inside of the trigger button (as shown) or to the outside surface of the handle which is opposed to the inside surface of the trigger button is a pad 82 of variable resistance material, the resistance of which decreases as a function of the pressure or force applied by the operator when he or she pulls the trigger. A device known as a force sensing resistor obtainable from Interlink Electronics of 1110 Mark Avenue, Carpinteria, Calif. 93013 may be used as the pad 82. The pad has leads 84 which extend to the electronics of the unit. The arrangement is shown in FIG. 13 and 13A. It will be understood that the use of a variable resistance pad is optional, but desirable when the length of the scan across the code is to be manually variable.

Figures 12, 12A:
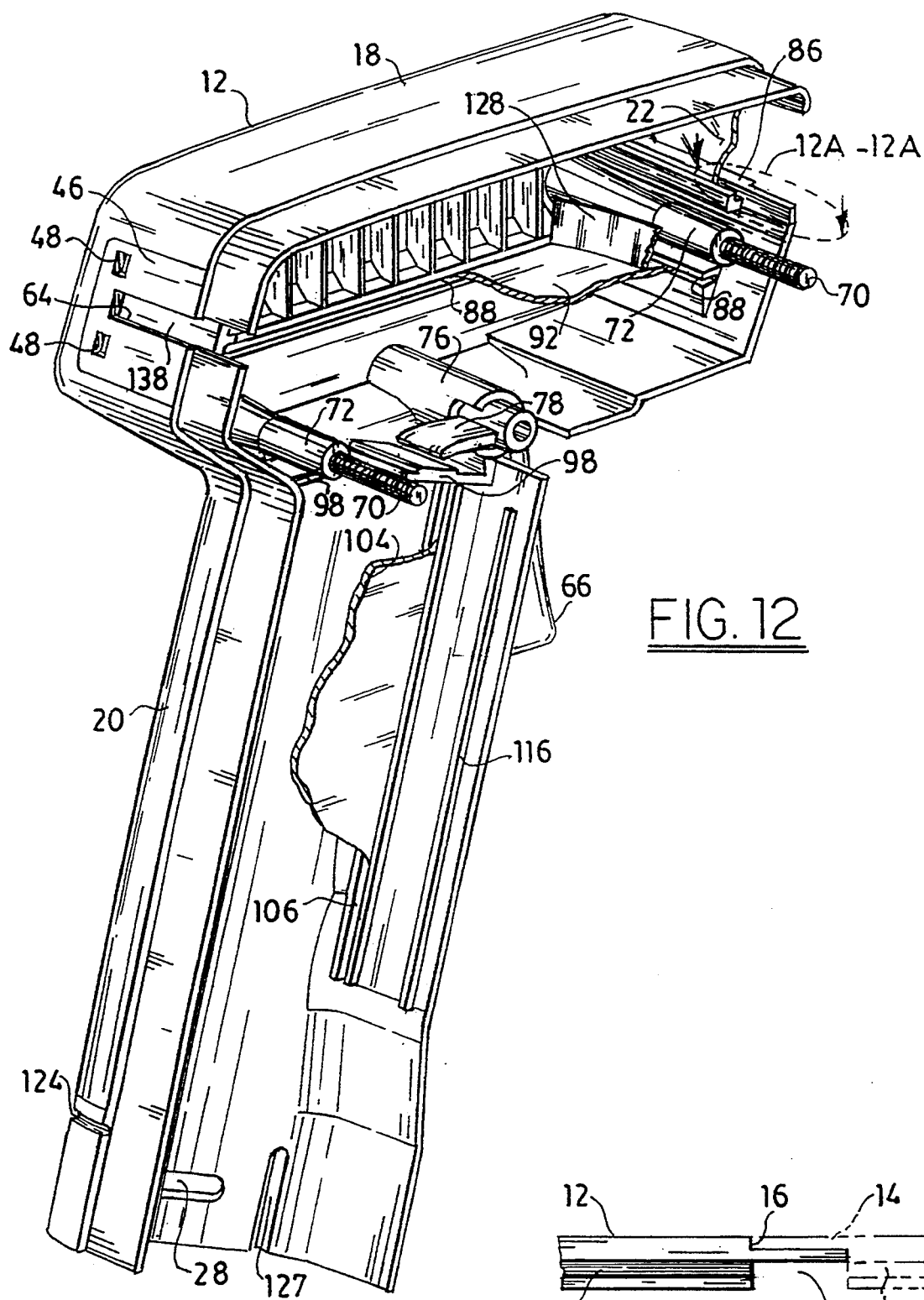
FIG. 12 is a perspective view illustrating one of the halves of the housing or casing of the scanner illustrated in FIGS. 1 through 6 when viewed from the rear.
FIG. 12A is an enlarged sectional view of the area inside the lines 12A—12A in FIG.12.

The parts 12 and 14 of the housing are coped at the parting plane 16 to define an overlapping joint best shown in FIG. 12A. This joint provides a long discharge path for static electricity and serves to shield the electronics within the housing.

The front end of the housing has ribs 86 which define a channel for securing the window 22. On the inside surface of the head portion 18 there are provided tracks which define a generally U-shaped channel 88. In the right hand head portion 12 shown in FIGS. 12 and 13, the ends of this channel 88 are spaced inwardly from the parting plane 16. There is a gap 90 (FIG. 12A) between the ends of the channel in the halves 12 and 14 of the housing. In the channel 88, there is disposed a printed circuit board 92 which carries the optical and electronic components of the scanner/reader unit. This board, with the components thereon, are inserted in one of the halves in the channel 88 therein and then, as the housing halves are assembled, into the channel in the other half of the housing. No shock mounts are used to support the board and its opto/electronic assembly. It has been found that this arrangement supports the assembly in a manner to prevent damage from shock loads, for example when the unit is dropped onto the floor.

Ribs 94 extend along the roof of the head portion and serve to deflect ambient light which may enter the head portion through the window 22 away from the light collection components of the electro-optic assembly. Ribs 96 on the sides and top of the head portion and stiffen it against deflection and serve as light baffles. The bottom of the head portion has an internal shelve 98 in which a male multi-pin connector 100 is fixedly disposed (see FIG. 4). This connector is wired to a male part of another connector 102 which is attached to the bottom of the printed circuit board 92 via a ribbon cable 105. The connections from the cable 32 are made via a printed circuit board 104 in the handle. This printed circuit board has the modular connector 36 at the lower end thereof and the female part of the connector 100 at the upper end thereof.

The handle portion 20 has ribs which define channels 106 and 108 on the forward and rear sides of the handle in which the board 104 is inserted. The board 104 has a notch defining an opening 110 in which a battery 112 is contained. The battery 112 has its terminals in contact with spring contacts 114 on the lower edge of the notch part of the board 104. These spring connectors urge the battery out of the housing when the end cap 26 is removed. To retain the board 104, there is a projecting catch 116 which latches either in a notch in the edge of the board 104 as shown or under the board 104. The modular connector 36 is attached to the lower end of the board 104 and engages a male prong which extends from the cable 32, the male part of the modular connector being formed in and extending inwardly of the housing through the end cap 26.

Another channel for another printed circuit board is provided by a rib 116 in the handle portion 20 of the housing part 12 and an opposed rib (not shown) in the other housing part 14. Another circuit board 120 containing other, optional circuits of the scanner/reader unit forms an assembly with the board 104 when connected thereto via a bridging connector 122 (see FIG. 4A). Then both boards 104 and 120 are desirably inserted at the same time into the assembled housing when the end cap 26 is removed.

The housing parts are preferably made of plastic material, such as polycarbonate or ABS. A groove 124 in which a elastomeric seal 126 may be located seals the open end of the handle 20. The sides of the handle 20 are formed with grooves 127 (see FIGS. 12 and 13) which renders the lower end of the handle flexible so that a boss can flex outwardly to the hole 28, and act as a detent catch to hold the end cap 26 in place, with contact made in the modular connector 36 and with the battery 112 held in place.

The optical and electrical assembly on the printed circuit board 92 has as its major components, in addition to the board 92, a collection mirror 128, a laser diode assembly 130, a photodetector and scanning motor assembly 132, and a beam deflector in the form of an oscillating or dithering mirror 134. A flexible printed circuit board 136 is connected to the board 92 and extends upwardly behind a holding member 138 (FIGS. 12 and 13). The flexible board 136 carries on one leg 136A or a pair of legs 136A & B, the LEDs 60 and 62, and a connector (not shown) which extends through the slot 64 for connection of the LCD display (if such a display is used). The flexible board 136 is folded much like a ribbon inwardly of the board and then outwardly. The leg 136B have wiring which is connected to the laser diode in the laser diode assembly 130 and the motor in the photodetector motor assembly 132.

The mirror 128 has a spherical reflecting surface 138 which faces the photo diode 140 in the assembly 132. This mirror 128 has a base 142 with a flexible tab 144 and side flanges 146 which form rabbett joints with the side edges of the board 92. These edges are coped inwardly so as to provide clearance for the flanges 146. The tab 144 is flexural and acts as a detent latch which latches in an indentation 150 in the board. The positioning of the mirror is not critical because the outgoing and return beam extend over conjugate paths so that positioning errors are automatically compensated. The center of the mirror has a planar facet 152 which deflects the beam from the laser diode to the mirror 134. The mirror receives the scattered light returned from the code as the oscillating mirror 134 scans, collects that light and directs it to the photo diode 140.

The motor assembly 132 includes a motor 160 having a shaft 162. The mirror 134 has a rear bracket 164 with a vertical slot 166 so as to enable the mirror, which may be plastic material, to be force-fit onto the shaft 162. The motor 160 and the photo diode 140 are assembled by a cover 168 which has flanges 170 which are rivetted or screwed to the board 92.

Figure 8:
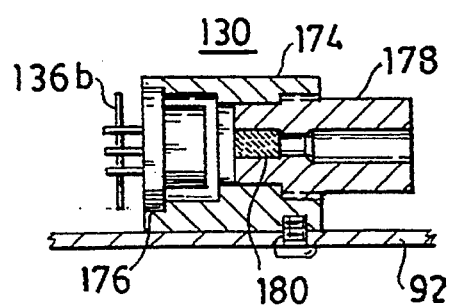
FIG. 8 is a sectional view illustrating the laser diode and its optical assembly, the laser diode being mounted on the printed circuit board of the scanner shown in FIGS. 1 through 6 and schematically in FIG. 7.

The laser diode assembly 130 is shown in greater detail in FIG. 8. It includes a barrel 174 which is attached as by screws to the board 92. A laser diode 176 is positioned in the rear end of the barrel 174. A lens assembly 178, including a gradient index lens 180, is screwed into the barrel 174. The orientation of the laser is such that the long dimension of the laser beam is generally parallel to the plane of the board 92 thereby utilizing diffraction for orientating and shaping the beam which is incident on the code, as described in detail below.

Other circuit components, including a microprocessor chip, which are discussed in greater detail hereinafter in connection with FIG. 14, are mounted on the board 92. They are not shown in FIGS. 4, 5 and 6 in order to simplify the illustration.

Figure 9:
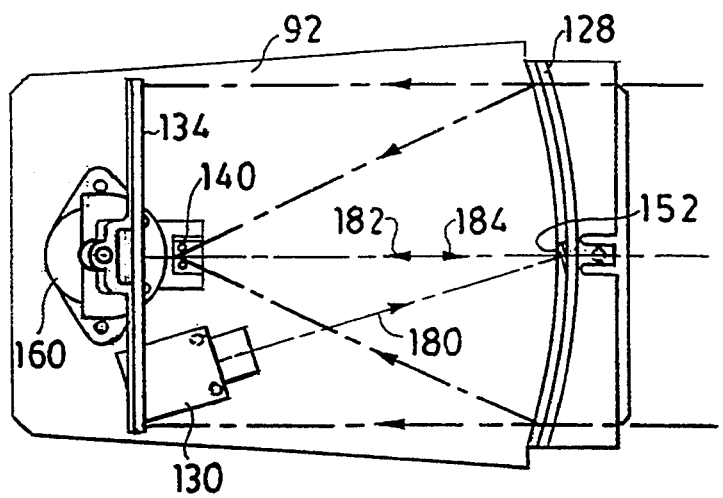
FIGS. 9 through 11 are diagramatic views illustrating the operation of the optics of the scanner shown in the preceding figures in producing the outgoing laser beam and in receiving the incoming return light scattered from the code.
Figure 10:
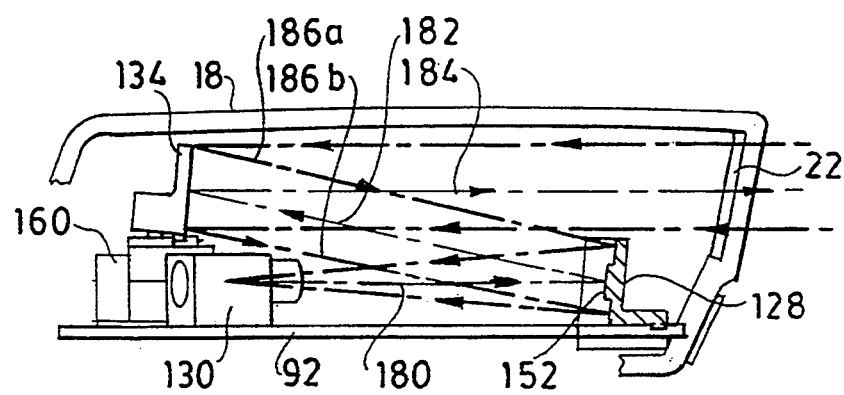
Figure 11:
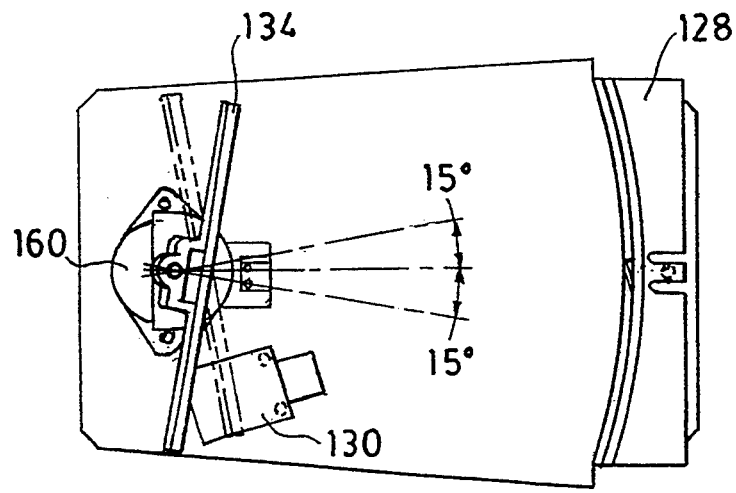

Referring next to FIGS. 9, 10 and 11, there is shown the arrangement of the optical elements which has the feature of eliminating parallax induced errors in the detected bar code signals while allowing all of the optical elements to be arranged on the single printed circuit board 92. The laser assembly 130 projects a beam along a first path 180 to the facet 152. The facet is tilted upwardly so as to project the beam along a second path 182 to the mirror 134. The mirror is tilted slightly downwardly and projects the outgoing beam along a path 184 through the window 22 towards the code to be recognized. In FIG. 10, the outgoing beam is shown by the relatively thin line made up of long and short dashes while the incoming or return light is shown by the heavier lines of long and short dashes.

The mirror 134 oscillates back and forth about the center of scan (a line between the end points of the scan). Preferably, the center of scan extends through the center of the window 22. The scan angle may, for example, be plus or minus 15 degrees about the center of scan as shown in FIG. 11. This scan angle is sufficient to scan the beam across codes within the scanning range of the unit. This range may start at the window or at a distance exterior from the window 22 depending on the anticipated location of the codes to be read. The scanning range is determined by the diffraction beam forming process as will be explained hereinafter in connection with FIGS. 7 and 7A. As the outgoing beam scans, its long dimension remains in a plane approximately parallel to the plane of the board 92. This plane may also be parallel to the plane of the top of the housing head portion 18.

The return light is scattered and fills the mirror 134. The mirror deflects the return light downwardly along a path within the lines 186A and B. It will be noted that this return path 186, when in the center of scan, is in the same plane as the path 182 of the light which is projected out of the scanner unit. The return light is then collected by the mirror 128 and focused, because of the spherical curvature of the mirror, at the photodetector 140.

Parallax is eliminated because there is symmetry between the outgoing beam and the beam of return light. This symmetrical arrangement of the beams is provided because of the use of the facet 152 in the center and along the optical axis of the collection mirror 128. As viewed with respect to the collection mirror, the distance of the outgoing beam to the code and back from the code is the same (i.e., the code is symmetrical relationship with respect to the collection mirror). The light executes the same path going out and coming in from the code. Therefore, symmetry is preserved even though the laser diode is offset from the photodetector and the beam from the diode makes an acute angle to the plane in which the paths 182 and 184 are contained. Accordingly, all of the optical elements can be placed conveniently on the printed circuit board and mounted thereon without introducing parallax caused errors which can adversely affect the uniformity of intensity of the light collected from the bar code over the scan light.

The design of the optics provides a elliptically shaped beam throughout the range in which the code can be located during scanning to derive the bar code signal. This elliptical shape is upright; the major axis of the ellipse being along the bars and spaces of the code. As compared to scanning with a beam which forms a circular spot, the elliptical beam is preferable because of the averaging effect over defects and deficiencies in the code. The aspect ratio of the ellipse is selected to provide adequate averaging of the code and relative insensitivity to scan line tilt. An aspect ratio of the ellipse can be chosen so that there is no apparent difference between an elliptical scanner or a circular scanner with respect to scan line tilt. An aspect ratio of five (5) to one (1) is suitable to accomodate a scan line tilt of 15° at the extremes of the scanner's working range.

The operating range of laser based bar code scanners which have been designed in accordance with traditional geometric optics have utilized large F number elements in order to achieve a desired scanner range, because the scanning range is determined by the depth of focus. To maintain a beam in an elliptical shape, traditional geometric optics resorted to apertures and focusing lenses for beam shaping. Traditionally a elliptical beam was formed using a lens system to collimate the beam from the laser. The collimated wavefront was transmitted through the oblong or rectangular aperture and then focused with a lens so that the narrow dimension or waist of the beam remains of substantially constant diameter over the operating range of the scanner. The operating range was restricted by the F number of the outgoing beam. It was further restricted because of the 90 degree flip of an elliptical beam formed by an oblong aperture. After the position in space at which the beam flips the beam is disposed with its long axis transverse to the code, diminishing severely the resolving power of the scanner. This invention utilizes diffraction effects to provide the beam with the desired profile (oblong or elliptical) and with the desired orientation (major or long axis in the direction of the bars and spaces of the code) throughout the desired working range of the scanner.

Figure 7:
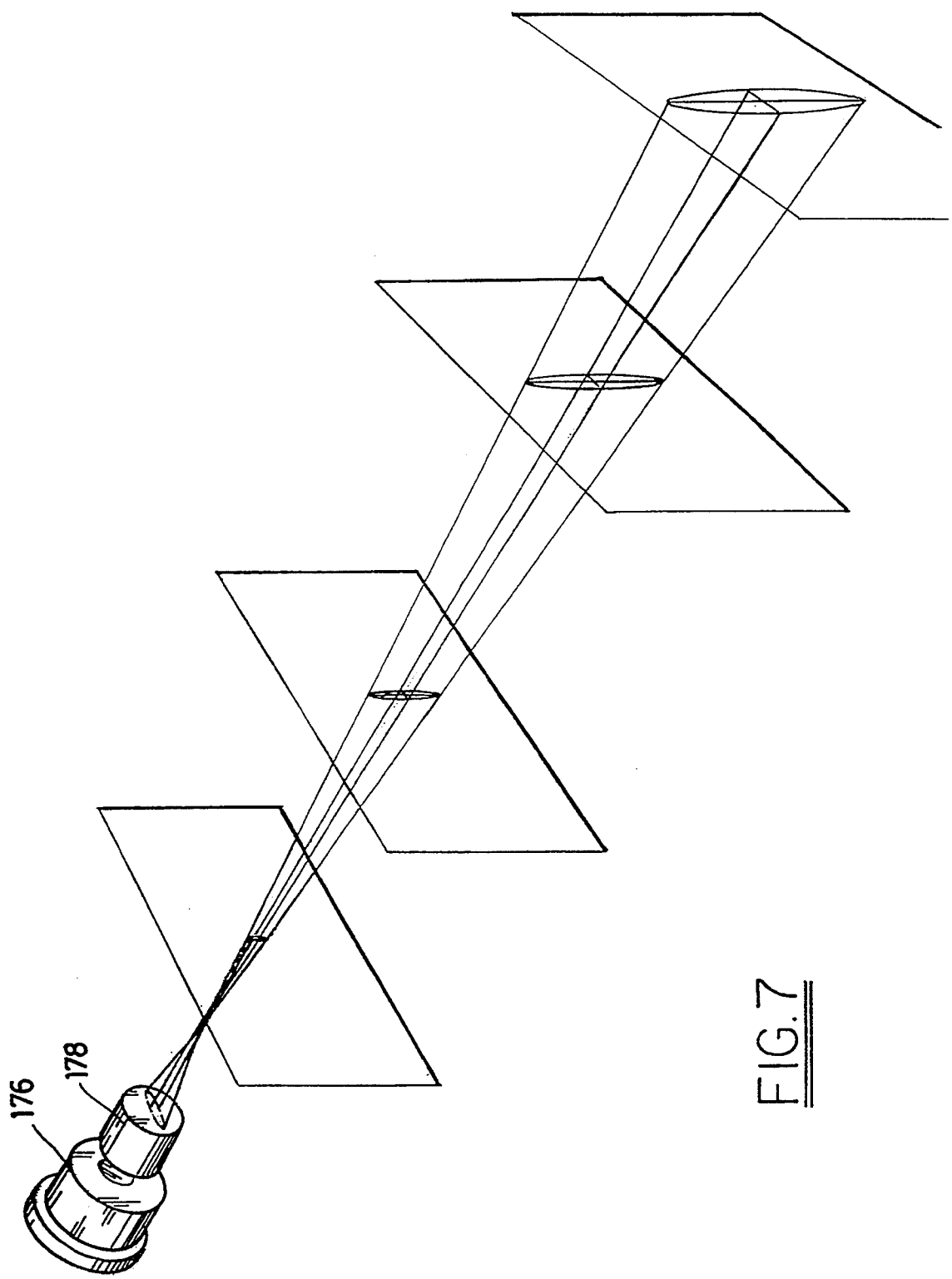
FIG. 7 is a diagramatic view illustrating the performance of the elliptical beam shaping system of the scanner shown in the preceding figures.
Figure 7A:
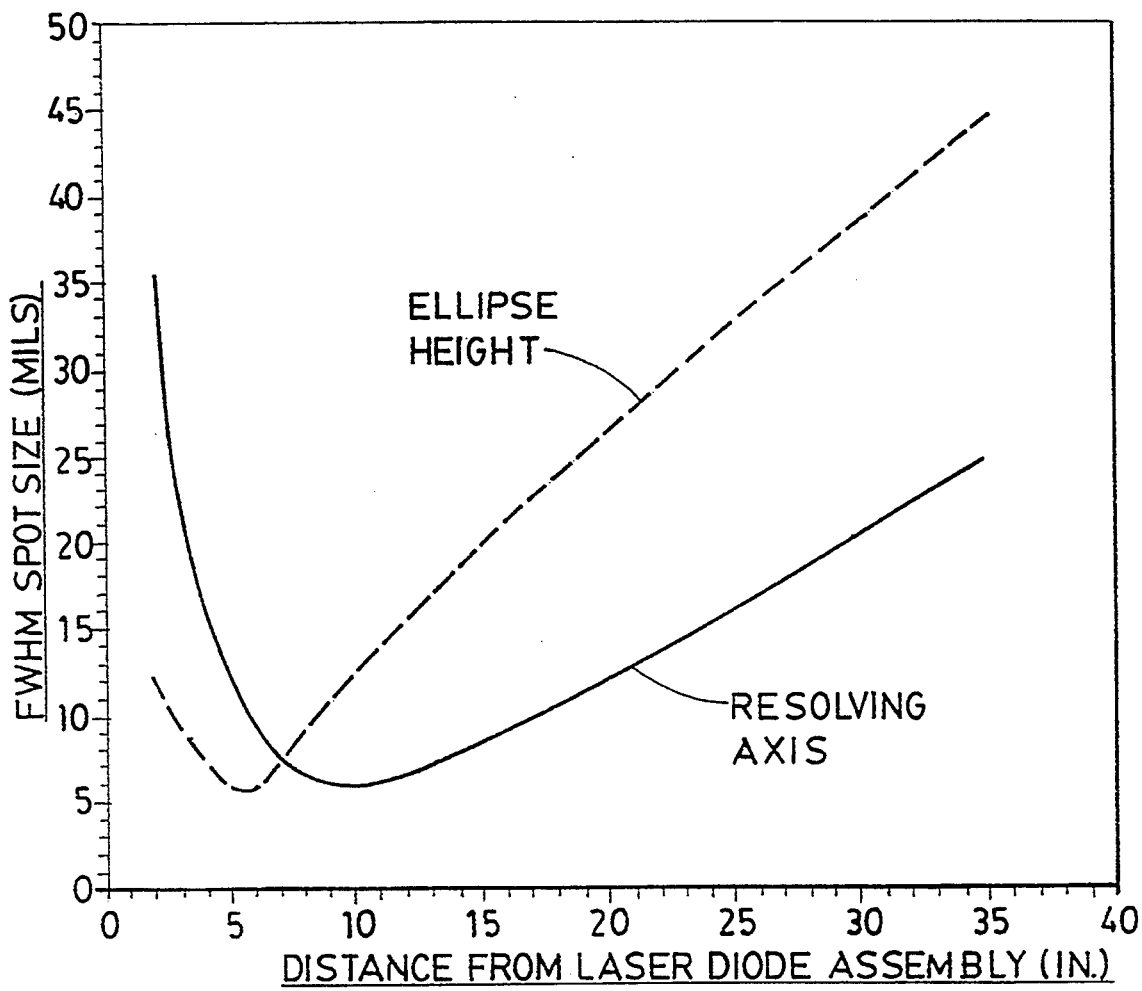
FIG. 7A is a plot showing the variation in width and length of the laser spot in the far field and illustrating that the aspect ratio (length/width) remains constant in the far field throughout the scanning range of the system.

Consider the full width, half maximum spot size of a beam transmitted through an aperture. The size is determined by diffraction effects. FIG. 7A considers the beam in two parts. One, the long part of the beam (along the major axis or the height of the ellipse). The other curve in FIG. 7A illustrates the resolving axis and considers its length which is along the minor axis of the ellipse. In both cases, near field diffraction first occurs. This is also known as Fresnel diffraction. The beam size decreases, for example, to about one-third to one-fourth of its size at the aperture (exit pupil of the light source). The minimum spot size depends upon the aperture size and occurs approximately at the Fresnel distance from the exit pupil of the source. This distance is equal to the square of the effective aperture size divided by the wavelength of the light (this is essentially monochromatic light when a laser, such as a laser diode is used). When the Fresnel distance is passed, an elliptical beam flips its orientation. This is shown in FIG. 7A by the relationship of the spot size along the ellipse height and the resolving axis of the ellipse.

The near field region terminates at the Fresnel distance. The longest Fresnel distance is defined by the length or ellipse major axis at the effective aperture. Beyond this point the region of far field diffraction (sometimes called Fraunhofer diffraction) exists. In the far field region the spot size increases. The increase is, however, approximately proportional to the reciprocal of the aperture size (1/aperture size). FIG. 7 illustrates the profile of the spot in four planes, each displaced further from the scanner, but all within the range in which far field diffraction occurs. The inversely proportional relationship of the aperture size along the resolving axis and along the ellipse height is used to advantage in order to make the aspect ratio (ellipse height/resolving axis length) constant throughout the far field range. The substantially constant aspect ratio is apparent from FIG. 7A. FIG. 7A also shows that the slope of the spot size variation with respect to distance from the source is such that the slope of the spot size variation in the far field is proportional to the reciprocal of the aperture size.

The shortest Fresnel distance (determined by the largest aperture dimension—in this case, the ellipse height) is often desirably within or near the scanner housing or inside or near the window 22 of the scanner shown in the preceding figures. In order to locate the far field diffraction range starting a few inches away from the window 22 and also to provide a phantom aperture which will maintain the aspect ratio of the elliptical beam in this scanning (far field diffraction) range using the diverging beam from a visible laser diode, it is desirable to use a very short focal length lens. The effective Fresnel distance $D_{eff}$ with a lens is reduced as a function of the focal length of the lens in accordance with the following relationship:

$$1/D_{eff} = 1/D - 1/f$$

Where D is the Fresnel distance as determined by the aperture size and the wavelength of the light and f is the focal length of the lens. A gradient index lens 180 is preferably used as a short focal length (for example 2.5 mm focal length lens). The effective aperture is formed where the lens begins to focus the diverging wavefront from the laser 176. This is called the principal plane of the lens and is effectively the exit pupil of the source where a phantom aperture exists. Locating the lens principal plane with respect to the laser 176 also determines the phantom aperture plane location and, the size of the ellipse and the resolving or minor axis of the ellipse. As shown in FIG. 7, the ellipse height at the principal plane (the phantom aperture) is desirably disposed transverse to the code so as to take advantage of the flip in the profile which occurs after the longest Fresnel distance. Accordingly, the beam forming diffractive optics of the invention, makes advantageous use of far field diffraction and simplifies the optics by elimination of apertures and needs only a single lens to set the size of a phantom aperture.

Referring next to FIG. 14, there is shown the electronic circuitry of the bar code scanner/reader. All of this circuitry may be located on the printed circuit board contained in the head of the unit. The printed circuit board also mounts the collection mirror and the deflector (scanning mirror) and its motor. The feature of the electronic system shown in FIG. 14 is that it is totally digitally controlled. Some of the principal parts of the circuitry are: (a) the front end or bar code reading circuits 140; (b) the laser regulating and drive circuits 144 which control current to and drive the laser diode LD and photo diode PD assembly 142; (c) motor drive circuits 146 which operate the motor 148 which is a stepper motor having phase A and B stator drive coils; and (d) interface circuits 150a and 150b which output the bar code signal and receive command signals and data from the host computer. There are also indicator (display) circuits 152 which include LEDs.

Digital control is provided by a computer system 154 having a microprocessor 156. An analog to digital converter (ADC) 158 and a nonvolatile memory (NVM) which may be an electrically erasable programmable read only memory (EEPROM) 160 are associated with the microprocessor 156. The microprocessor may be a commercially available chip such as the Motorola MC68HC705C8. This chip has a multiplicity of ports DP0 to DP21 which may be used to receive data and commands and to output data and commands. The microprocessor may be programmed from the host computer with data which arrives on the ACK line through the interface logic 162. Under programmed control, an output command SDPOL is provided by the state of the SDPOL line from DP3 to make the scanner compatible with the polarity and level of the data from the host computer. Universal compatibility with various types of hosts is, therefore, provided. This data is outputted on the serial data input (SDIN) line to DP2 of the microprocessor 156 and thence delivered on the data input line (DI) from port DP1 to the memory 160 where the program is stored. The memory is enabled to receive programming data by clock signals from the computer chip 156, when an enabling line CS1 of 4 enabling lines which selectively enable the various peripherals (the ADC 158, the NVM 160 and the digital control elements in the front end 140 and in the regulator 144). In this way, the various peripherals can be multiplexed for input and output of data to the microprocessor 156.

The scanner is enabled either by the trigger switch (TRIG-SW) in the scanner or from the host in response to an enable command. The application of power may also enable the scanner. Thus, the scanner can be enabled three ways either with the trigger switch, the enable input, or by application of power. The scanner could be enabled by any scanner input by suitable modification of the program. The interface 150a has logic 164 which handles these enable signals and ORs them to generate a WAKE signal which operates the power control 165 as by setting a flip-flop (F/F) which then turns on a voltage regulator circuit 166. The circuit 166 has a regulator chip of conventional design which regulates the output supply voltage from the computer, power supply, portable terminal or battery in the handle of the scanner and provides a regulated voltage indicated at +V, which may be 5 volts. The power stays on until a SLEEP command from port DP9 of the microprocessor 156 is generated, either on code detection or after a time-out, as may be programmed by the programming data in the memory 160. This operation conserves battery power to increase battery life.

The programming data is stored in the memory 160 under control of the microprocessor 156. It may be desirable to read the programming data. Then, that data is made available on the SD out line from the port DP4 of the processor 156. The output data (serial data output) is multiplexed under program control in the microprocessor 156 and supplied to an output line (BCV bar code video or PROG.DATA) from the interface logic 150b. The polarity of the output data, whether BCV or program data is controlled by the BCPOL line to be compatible with the host computer.

The host computer operates to decode the BCV signal. The BCV signal is obtained from the front end 140 and represents the bar code message by the analog timing of the pulses thereof. The host may use conventional decode logic to obtain the bar code message which is received. Another output from the interface logic 150b is the start of scan (SOS) signal which indicates when the beam is at the starting ends of its scan, either on the right hand or the left or both. The program in the microprocessor which controls the scanning motor 158 to oscillate the mirror provides the SOS output which is a level which changes state at the end of scan. This is to be distinguished from the BCV or program data level which is controlled by BCPOL depending upon the requirements of the host. The bar code video may be black high or white high. The scanner generates BCV as white high in this embodiment of the invention, which can be converted to black high in order to meet the requirements of the decoder in the system computer with which this scanner and other scanners in the system work.

The front end 140 has a photo diode circuit 168 which develops a current signal depending upon the intensity of the return light. This signal is converted into a voltage signal by a transimpedence (TRANS-Z) amplifier 170. The voltage signal is then differentiated in a differentiating circuit 172 to follow the transitions in the signal which correspond to the locations of the edges of the bars and spaces. A digital control element 174 in the form of a digital potentiometer provides forward gain control to the first amplifier in a chain of amplifiers 176 and variability of translation of the return light into signals which represent the bar code. The gain control is automatic and the digital pot 174 is set by the digital input (DI) which is stored in a register in the digital pot 174 when it is enabled by the enabling signal CS2. The digital pot 174 may be ½ of a dual pot circuit element containing another digital pot 178 which is used as the digital control element in the laser regulator circuit 144 and will be described hereinafter. The DI signal may be, for example, 16 bits stored in a common register of the dual pot 174 and 178, the pots using the first and last 8 bits in the register (DP1 and DP2).

The gain of the front end is set under computer control. Since the scanner scans in opposite directions and the velocity of scan or intensity of the return light may be different in each direction of scan, the digital pot 174 is set to follow the intensity of the return light not on the immediately preceding scan but the scan which occurred before the immediately preceding scan or on alternate scans. The program then changes the gain on alternate scans so that the amplifier output signal amplitude stays constant from scan to scan. In addition the relationship between the intensity of the return light and the gain (the sensitivity of translation of the return light into electrical signals which provide the BCV) may be in any desired functional relationship, whether linear or non-linear, under program control which sets up the relationship between the value of DI and the signal corresponding to the intensity of the light.

It is desirable to turn off the front end so that spurious illumination does not generate signals which may be confused with actual bar code video output or program data. To this end the microprocessor generates a not-kill bar code (KBC) which enables the amplifiers to transmit output signals only during actual scanning operations. The signal which controls the gain, and therefore the sensitivity of translation in accordance with the intensity of the return light is a peak detector circuit 180 which follows the peaks of the gain controlled differentiated voltage representing the bar code. The output of the circuit 180 is a voltage level DPD. This level is digitized in the ADC 158. The ADC has a plurality of channels one of which (CH1) receives DPD. Analog to digital conversion is enabled when the chip select CS0 is high and also when a code (DI) from the microprocessor identifying the channel to be digitized exists.

The voltage representing the bar code is translated into analog pulses (the BCV) by a discriminator circuit 182 including a comparator 184 which compares the differentiated signal with a peak voltage on a capacitor 186 charged through oppositely polarized diodes 188. The design of the discriminator 182 is the subject matter of U.S. patent application Ser. No. 832,878, filed Feb. 10, 1992 which is a continuation of application Ser. No. 518,608, filed May 3, 1990 in the name of Jay M. Eastman and assigned to the same assignee as this application, now U.S. Pat. No. 5,210,397, issued May 11, 1993. The discriminator outputs BCV which is applied to a port DP7 of the microprocessor 156 and also may be applied to the host computer via the interface logic 150b.

The laser regulator circuit includes a control loop having a comparator 190 which outputs an error signal to a driver amplifier 192 thereby controlling the current through the laser diode Lb. This current is available at ILS and is applied to CH0 of the ADC 158 for digitization during laser output power regulation and also during initialization of the laser to set its power output. The control loop includes a photo diode PD which is optically coupled to the laser diode and provides an output current across a resistor 194, representing the laser optical output power, which is compared with a reference input to the comparator 190 to derive the error, control signal for controlling the laser current. This reference signal is obtained from the digital pot 178 which receives a regulated reference voltage at one end thereof. In order to prevent the laser from being turned on except during a scan, a transistor switch 196 drives the reference input to the comparator 190 to ground thereby cutting off current to the laser diode.

The optical power is calibrated to a desired power which is represented by digital signals in the memory 160 by setting the digital pot 178. During calibration, in manufacture of the scanner, an ILS value corresponding to the desired optical power as measured by an exterior power meter is obtained and the corresponding ILS value stored as a parameter in the memory 160 or elsewhere in the microprocessor 156. Then the digital pot resistance is changed to increase the reference voltage applied to the comparator 190. During normal scanning, if ILS exceeds predetermined current value (e.g., 25% above nominal operating current as might be the case if the laser is operated at a temperature over its recommended maximum operating temperature), the laser is turned off. Then, operating the trigger switch or receiving an enable from the host computer will not cause the laser to be powered up at an excessive current which might destroy the laser.

During normal laser regulating operation, the value of the reference voltage as obtained across the digital pot 178 stays constant and the control loop regulates the laser current in order to maintain ILS at a desired value for prescribed laser optical power output.

During factory calibration, the digital pot 178 setting is determined upon command of the external computer and optical power meter, whose analog output is attached to the ADC's 158 PWCAL input through a buffer amplifier 159. The calibration procedure is controlled by the scanner's microprocessor in the following manner. The digital pot setting is steadily increased from minimum to maximum power while both the laser current (ILS) and optical power PWCAL are monitored. When the measured power agrees with the requested power (sent by the external computer as part of the command), the scanner's microprocessor saves the digital pot setting and laser current readings in NVM 160. If, during calibration, several different pot settings are tried without a difference in measured power being noted or excessive changes in measured laser current are noted, the calibration mode is cancelled (to protect the scanner's circuitry) and a "calibration failed message" is sent to the external computer.

The motor windings are driven by current pulses, the direction of which in each coil is controlled by push-pull amplifiers (PPAMPL) 198 and 200 for coil A and 202 and 204 for coil B. These pulses are controlled in duration by the duration of the motor control levels SDAA1 through SDBA2 from the microprocessor 156. In other words, pulse width modulation is used to produce waveforms on the coils A and B to control the motor to provide generally linear scan velocity. Moreover, the maximum pulse width determines the length of the scan. In prior motor controls systems, bias current was applied to one winding, while the current to the other winding was changed linearly. Such linear change does not produce a linear velocity during the scan. By pulse width modulation control (microstepping), the requisite non-linear variation in current to the coils during the scan can be obtained to obtain a generally linear sweep velocity over the scan. By controlling the direction of the current, the motor and the oscillating mirror can be centered so that the center of scan is approximately at the center of the window thereby avoiding the need for mechanical centering.

The scan length (scan angle) is controlled by controlling the amplitude of the average current in each coil during the scan. The higher the average current through the coil the larger the excursion. Thus by increasing the duty cycle over the scan, the scan angle increases.

Control of scan length is obtained using the microprocessor 156 and an analog triggering mechanism represented as a resistor 206 having a resistance which is inversely proportional to the force or pressure applied by the trigger thereon. This resistor may be a pad of polymer material which is commercially available and called a force sensing resistor (effectively a strain gauge). Such pads are obtainable from Interlink Electronics of Santa Barbara, Calif. 93103. The voltage across the variable resistor pad 206 is presented to channel 2 of the ADC 158. Under program control, the microprocessor in response to the digital input (DO to DP0), the average current is changed in response to the pressure applied by the operator against the trigger and thence to the resistive pad. At the beginning of a scanning operation, very little force can be applied thereby providing a very narrow scan suitable for aiming the beam at a particular code, which may be one of a multiplicity of closely spaced codes on the side of a package or a sheet of paper. The spot where the beam is incident is bright because the beam is not spread out thereby facilitating aiming. Once the code is located, the pressure can be increased and the scan length (scan angle) increased in accordance with the microprocessor's program which varies the timing of the output levels SDAA1 through SDBA2 on DP10 through DP17.

The microprocessor also provides outputs SLED and GRLED which may be low during scanning and following the successful reading of a bar code symbol and when the power control is on (between the times of occurrence of the wake and sleep commands). Then the SLED or the GRLED 152 will be lit.

It has been found that a simplified motor control circuit such as shown in FIG. 14A may be used in which only two commands SDAA1 and SDBA1 are needed. Then current flows through the motor coils A and B only in one direction. It has been found that by modulating the duty cycle of the SDAA1 and SDBA1 pulses which are applied through RC damping circuits, the scan velocity and length may be controlled. The scan oscillation or repetition rate is also controlled by the periods during which the motor control pulses execute a cycle (i.e., the maximum duty cycle or period of the pulses). The programming of the microprocessor 156 to obtain the digital control functions discussed above, will become more apparent from FIGS. 15 through 19.

The overall program is called Power On Start. The CPU is first initialized. New data is loaded into the microprocessor internal memory from the external non-volatile memory (NVM). This is done every time a wake signal occurs; the wake signal acting as an interrupt to go to the initialize process.

The next process is the calibration of the AGC which determines the amplifier's bias voltage by averaging many samples of DPD under no signal conditions (laser off and motor stationary). This process compensates for scanner-to-scanner component tolerance variations.

The CAL AGC routine is shown in FIG. 16. The digital pot in the front end is reset to its maximum resistance. Then, 256 samples of DPD are read via the ADC. The reading is accomplished at the maximum clock rate of the ADC.

The 256 samples of DPD are averaged. The average is named CAL. This average is used in computing the digital control signal to the digital pot 174 to set the amplifier gain during scanning operations. The program is described hereinafter in connection with FIG. 17.

Returning to FIG. 15, the program next sets the time delay for the generation of a sleep command after occurrence of a wake command. Then, all of the interface functions are set up utilizing the program data. At this time, if the host computer desires, the program can be checked by reading out the stored program back into the host. Levels corresponding to data states (polarity) and formats are now set up in the system and the system is now capable of receiving new commands. The decision is whether a command arrived on the ACK, EN (enable) or TRIG (trigger) or any combination thereof. If so, the system jumps to the routine called motor (MTR) which generates the pulses for operating the scan motor to scan the beam. During the scan routine, the laser power is regulated as will become more apparent from FIG. 18.

The system then waits for a decision as to whether either a sleep command was generated or if external serial data from the host computer contained another command. This other command may be a new program, a command to calibrate the laser diode so as to set a safe level of optical output power as required by governmental regulations or the like. A sleep command can also be generated by external data, for example, that a bar code has been decoded. After the sleep command occurs, the power to the laser diode is shut off and the system stays idle until the next wake command.

FIG. 17 illustrates the AGC routine. First, the CHI of the ADC is enabled to read the DPD level. Next, during scanning, the CPU reads DPD via the ADC approximately 100 times and stores the 16 largest readings at the frame's end. The average of these 16 values is used as DPD in the equation shown in FIG. 17. Gain codes (digital control signals) corresponding to G' are generated on each scan. Gain codes are used to control the gain for scans in the same direction as the scans on which they are derived. Therefore, two values of G' for alternate scans are stored. These are shown as LG' and RG' for scans to the left and to the right, respectively. The program controls the microprocessor to apply these alternate values to the DI data line to enable the digital pot 178 to control the gain in accordance with LG' and RG' values on alternate scans.

Referring to FIG. 18, there is shown the MTR routine during which the beam is scanned across the code. The routine starts by initializing values. The scan LED (SLED) is set high so that that LED is lit. The bar code polarity (BCPOL) is set so that the host computer and its decoder will receive bar code white high or black high levels corresponding to the bars and spaces of the code as required by the decoding format. Next, not kill bar code (KBC) is cleared, thereby allowing the amplifier chain 176 (see FIG. 14) to pass the differentiated bar code signal to the discriminator 182. The digital pots are set to their calibrated values both in the regulator (DIGPOT 178) and the AGC control in the front end 140 (DIGPOT 174). In order to initialize the routine which generates the scan motor drive pulses, a code representing the off period (OFFPER) for each scan current pulse cycle is then set to 0 value.

In order to understand the meaning of OFFPER and, in general, how the scan motor drive pulses are generated, consider FIGS. 20 and 21. These figures show the pulse width table and the SD (port) signal values. The tables are stored in memory (in the NVM160— FIG. 14). The pulse width table stores N pulse width values, 16 of which represent the motor coil current durations during a scan in one direction (e.g., to the left) and the remaining 16 (total 32) represent the durations of the current pulses for the scans in the opposite direction (to the right). In effect, the table represents the waveforms of the motor drive current during each scan in terms of corresponding pulse width modulated signals. It will be appreciated that a single pulse does not produce an entire scan but a series of pulses (in this case, 16 for each scan direction—8 for each phase) of different duty cycle define the waveform which controls the motor to execute a scan. The maximum duty cycle may for example, correspond to 16 clock pulse periods; the periods occurring at a rate of 240 per second (divided down from the 1 MHz microprocessor clock). The maximum period of the current pulse corresponding to 50% duty cycle is then 16 clock pulse periods. This maximum period is denoted by the symbol A in the flow chart for the scanning routine shown in FIG. 19. The off period is the difference i.e.,the maximum duty cycle period A minus the period of the pulse, $t_i$. In the pulse width table, the $t_i$ pulses have values from 0 to 15 which is the number of clock pulse periods per maximum duty cycle. It will be noted that the entire duty cycle is preferably not used. Thus, the pulse width table may store 32 (N=32) values which vary from 0 to 15 in numerical value.

The SD (port) signal values in the table shown in FIG. 21 represent the polarity of the current (the current direction) through the A and B coils of the scan motor corresponding to each successive $t_i$ value in the pulse width table. Thus, there are 16 index or I values for each scan, I=1; I=2; I=3 . . . I=N. These index values correspond to the pulse width table values, $t_i$=1; $t_i$=2; $t_i$=3 . . . $t_i$=(N+1). N=32 in this embodiment covering a left followed by a right scan. There are therefore corresponding port signal values for each pulse width value. The port signal values are those that exist during the time that the pulse is on, and not during the off period. During the off period the signal values at the ports are all 0 so that no current flows through the motor coils. The current to the phase A coils are controlled by four bits; SDAA1, SDAA2, SDAB1 and SDBB2 as shown in FIG. 14, since these coils are connected through push-pull amplifiers. Similarly, the phase B coil's current is determined by the levels of the ports SDBB1, SDBB2, SDBA1 and SDBA2. Different ones of these ports are high or low or off so as to drive the A coils with current in one direction (A+, or in the opposite direction, A—). Similarly, the phase B ports are either high or low to provide phase B current in opposite directions. In this embodiment only one coil (A or B) receives a pulse during any one of the 16 cycles where a drive pulse can be passed through a motor coil. This conserves battery power. Accordingly, by controlling the port signal values, currents corresponding to the pulse width values in the pulse width table are generated so as to drive the scan motor to oscillate back and forth with a different oscillation (scan) length corresponding to pulse widths, because the average current through the coil during each scan depends on the pulse width. For full pulse widths the durations of the pulses may be the maximum duty cycle or 15 clock pulse periods during each period in which a pulse can be generated (the A periods). The length of the A periods determines the number of scans per second. For 30 scans per second the clock pulses which make up the A periods run at 240 periods per second rate. The rate is increased for a faster scan rate and decreased for a slower scan rate. 30 scans per second is presently the preferred scan rate. The relationship between pulse rate and scan rate can be expressed mathematically as follows:

$$\text{Pulse Rate/Phase} = \frac{1}{\frac{\text{scans}}{\text{sec}} \cdot \frac{M}{2}}$$

where, M=Waveform samples/Phase.

In the event that the simplified motor drive circuit of FIG. 14A is used. The motor currents are either in one direction or off. Then, only two SD port signals are used. It will be noted that the last process in the routine of FIG. 18 is to pulse the SD ports to center the motor to the COS (center of scan). This is a desirable but not essential process in that the pulse widths and current directions in the motor coils may be adjusted so as to cause the beam to be centered approximately in the center of scan (which falls midway across the width of the window 22 in the scanner). The table values are obtained experimentally on an interactive basis with the host computer so as to obtain a generally constant velocity over the scan and in the plane of the code being scanned as may be observed by the intensity of the spot as it scans across a plane where the code may be located. To obtain different scan angles, a plurality of pulse width tables may be stored and the table corresponding to the desired scan angle selected.

Returning to FIG. 18, after initialization the laser diode is turned on. A command LDEN is set low, thereby disconnecting the transistor switch 196 from ground and allowing the laser to operate at the level set by the value of the digital signal which controls the digital pot 178 in the laser regulator 144.

Next, the table index is set at 0. A timer is then set to generate the first interrupt which allows entry into the scan routine shown in FIG. 19. This scan routine occurs asynchronously in the program. During the routine there are successive interrupts generated which cause the index to step and thereby output different pulse width table values and cause different corresponding SD port signal values to be generated at the SD ports of the microprocessor 156.

The next step in the routine is to determine if the laser current has exceeded its safe limits. This is done in the microprocessor 156 in response to the laser current value which is digitized in the ADC 158. In the event that the current limit is exceeded, destructive failure of the laser diode could occur. Then, the LDEN command is set high, thereby shutting off the laser diode. As part of this safety aspect of the motor routine, the computer flashes the SLED and GRLED commands on and off so that the operator can realize that the laser has overheated. The operator can then wait until the laser cools down before reattempting to start the system. For example, by pulling the trigger.

If a stop scanning command has been received, the laser diode and the scan LED are cut off. The counter which generates the interrupts in the scan motor drive routine shown in FIG. 19 is then inhibited so that the motor can no longer scan. Then, the operation noted above as being optional to center the motor electronically to the center of scan by pulsing the SD ports is carried out. The motor stops at the center of scan. If desired, the motor can be stopped at the center or at either end of the scan by detecting the table (FIG. 20) index value for the desired stop location and interrupting the motor drive current when that index value is detected. Starting scanning at an end of scan (with the mirror off center of scan), can minimize the time required to read a code, since the first scan is then a complete full length scan.

Consider next the routing shown in FIG. 19 where the scan motor pulses are generated. Generally, the routine has two states which occur respectively while the pulses $t_1, t_2 \ldots t_N$ are being generated and while these pulses are off (during $A-t_1, A-t_2, A-t_N$). The value in the first state is $t_i$ and the value in the second state is the off period (OFFPER). As noted above, during initialization, OFFPER is set to 0. The first time through the routine, upon occurrence of the first interrupt OFFPER is 0. In one branch of the routine the SD port signals are fetched from the SD table at the index value I=0, which was set in the second process step in the routine after initialization (see FIG. 18). Next, the off period is computed as the maximum duty cycle A minus the pulse width table value for the I index. The index is 0 on the first pass through the routine.

Next, a timer is set at the pulse width from the pulse width table for the index and an interrupt occurs on time-out. When this next interrupt occurs, the decision as to whether off period equals 0 is negative and the program proceeds to the other state. This is the off period time after the first current pulse. Accordingly, current to the motor windings is cut off. This is accomplished by setting SD port signal values for current cut off and no current flows to the coils (phases A and B) of the motor.

Next, a timer is set to the off period value which was computed during the first part of the routine. An interrupt then occurs on time-out. The next interrupt causes the routine to enter its first state so that the next pulses which drive the motor during the scan are generated. The index is also advanced by computing the index value by the modulo N addition shown in the flow chart of FIG. 19. The program proceeds to generate the next current pulse value. By then, in the other state of the routine the memory containing OFFPER is cleared. Accordingly, when the next interrupt occurs upon time-out of the timer which has been set to OFFPER, the routine proceeds along its first branch. It will therefore be seen that the routine switches from state to state (branch to branch) until a complete scan cycle (scan to the left and scan to the right) is executed.

The index number also represents the start of scan on the left and right scan. For example, index number equal to 1 starts the right scan and index number equal to 17 starts the left scan. The start of scan (SOSPORT) is then inverted to set the scan flag to indicate start of scan. This start of scan signal is used in the decoding process and is detected by the host computer via the interface logic 150b. The laser can be interrupted at these start of scan locations, in response to the table index values (see FIG. 20). The laser is then off where the beam velocity is minimal. This conserves electrical power, and reduces laser light output for safety considerations under computer control rather than by optical detection of the mirror position (see U.S. Pat. No. 4,820,911 of Apr. 11, 1989).

Returning to FIG. 18, it will be noted that the AGC digital pot setting adjustment is made when the SOS flag is on and continues to be made during each scan until the stop scanning command is received. The command may come from the host computer or may be the sleep signal generated upon time-out in the microprocessor.

From the foregoing description, it will be apparent that there has been provided an improved bar code scanning and reader system which is digitally controlled for flexibility in operation with various host computers or terminals to which the scanner/reader may be connected. The invention also provides improved optics, operative by diffraction, for forming the scanning beam and for insuring accuracy in reading by eliminating parallax. The invention also provides features of mechanical design to enhance reliability and reduce fabrication costs. Variations and modifications in the herein described system, within the scope of the invention will undoubtedly become apparent to those skilled in the art. Accordingly, the foregoing description should be taken as illustrative and not in a limiting sense.

We claim:

1. In a bar code scanner which has a motor, a source providing an optical beam and means driven by said motor for scanning the beam across a code, a system for controlling a motor to vary a distance across the code over which the beam is scanned which comprises:

means for driving said motor with first control signals operative to provide a marker beam that is indexed at an initial location at a point or area on the code where said marker beam is located on the code by visual observation;

manual control means for generating multi bit digital second control signals which increase said distance such that said marker beam becomes a variable scan length scanning beam which scans across the codes with a generally constant velocity to illuminate said code to provide light which is returned from said code corresponding thereto; and means for obtaining signals corresponding to data represented by said code from said light which is returned from said code.

2. The system according to claim 1 wherein said signals are pulses which are provided during each scan across said code and said driving means includes means for timing said pulses to provide said marker beam and said scanning beam.

3. The system according to claim 2 wherein said driving means includes means for generating said pulses in sequences which occurred during each scan across the code, and the timing means including means for varying the width of said pulses.

4. The system according to claim 3 wherein said timing means includes a computer for providing said sequences of variable width pulses, and means for applying digital control signals to said computer in response to which said computer varies the width of said pulses in said sequences.

5. The system according to claim 4 further comprising means for operating said computer to vary the rate of occurrence of said sequences to vary the velocity of said scanning beam across said code.

6. The system according to claim 4 wherein said computer has memory in which first and second tables of digital signals are stored respectively having values corresponding to the width of said pulses, and said computer also has means for reading out said tables to produce said sequences.

7. The system according to claim 6 further comprising means in said computer responsive to the values of said digital signals stored in one of said tables for providing outputs indicative of said beam being located at starting points of said each scan across the code.

8. The system according to claim 4 wherein said scanning means includes a deflector driven by said motor on which said optical beam from said source is incident.

9. The system according to claim 4 further comprising manually actuable means for providing an output upon actuation, and means responsive to said output for providing said digital control signals.

10. The system according to claim 9 wherein said manually actuable means comprises a trigger actuated by force applied to said trigger, and means operated by said trigger for providing said output in correspondence with the force applied to said trigger.

* * * * *